§ 371 (c)(1),
(2), (4) Date: Aug. 16, 2010

(87) PCT Pub. No.: WO2009/102046

PCT Pub. Date: Aug. 20, 2009

(65) Prior Publication Data

US 2011/0024247 A1 Feb. 3, 2011

(30) Foreign Application Priority Data

Feb. 13, 2008 (JP) .................................. 2008-31452
Mar. 18, 2008 (JP) .................................. 2008-69784
Dec. 17, 2008 (JP) .................................. 2008-320857

(51) Int. Cl.
*F16F 9/50* (2006.01)
*F16F 9/49* (2006.01)
(52) U.S. Cl.
USPC ...................................... 188/282.6; 188/280
(58) Field of Classification Search
USPC .............. 188/282.5, 282.6, 316, 322.15, 313,
188/282.1, 284, 287, 280
See application file for complete search history.

(12) United States Patent
Chikamatsu

(10) Patent No.: US 8,794,403 B2
(45) Date of Patent: Aug. 5, 2014

(54) DAMPING FORCE GENERATING MECHANISM FOR HYDRAULIC SHOCK ABSORBER

(75) Inventor: Satoshi Chikamatsu, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 592 days.

(21) Appl. No.: 12/867,885

(22) PCT Filed: Feb. 9, 2009

(86) PCT No.: PCT/JP2009/052455

(56) References Cited

U.S. PATENT DOCUMENTS

| 5,497,862 A * | 3/1996 | Hoya .......................... 188/282.5 |
| 6,318,523 B1 * | 11/2001 | Moradmand et al. ......... 188/280 |
| 8,042,661 B2 * | 10/2011 | Ota et al. ................. 188/322.15 |
| 2008/0149438 A1 * | 6/2008 | Chikamatsu et al. ......... 188/313 |
| 2009/0065315 A1 * | 3/2009 | Chikamatsu .................. 188/313 |

FOREIGN PATENT DOCUMENTS

| EP | 1947363 A1 | 7/2008 |
| JP | 07-197975 A | 8/1995 |
| JP | 07-317825 A | 12/1995 |
| JP | 09-291961 A | 11/1997 |
| JP | 2007-100726 A | 4/2007 |
| JP | 2007-132389 A | 5/2007 |
| JP | 2008-008483 A | 1/2008 |

* cited by examiner

*Primary Examiner* — Robert A Siconolfi
*Assistant Examiner* — Vishal Sahni
(74) *Attorney, Agent, or Firm* — Rabin & Berdo, P.C.

(57) ABSTRACT

A port (2a, 2b) allows a fluid to flow from a first fluid chamber (41, 42) to a second fluid chamber (42, 41) separated by the piston (1) of a shock absorber via a damping valve (10a, 10b). A flow sectional area of a passage (21d, 21e, 26d, 26e) connecting the first fluid chamber (41, 42) to the port (2a, 2b) is reduced by a throttle valve (12, 14, 51, 52) according to a pressure in the first fluid chamber (41, 42). A pressure of a pressure chamber (18, 19) and a biasing force of a plate spring (25, 29, 71, 72) acts on the throttle valve (12, 14, 51, 52) in an opposite direction to the pressure of the first fluid chamber (41, 42). The hydraulic shock absorber is thereby caused to generate different damping force characteristics depending on a stroke speed of the piston (1).

17 Claims, 14 Drawing Sheets

DAMPING FORCE GENERATING MECHANISM FOR HYDRAULIC SHOCK ABSORBER

FIELD OF THE INVENTION

This invention relates to a damping force generating mechanism for a hydraulic shock absorber.

BACKGROUND OF THE INVENTION

In a hydraulic shock absorber for a vehicle, for example, the interior of a cylinder is divided into two fluid chambers by a piston, the fluid chambers are connected by a passage penetrating the piston vertically, and a leaf valve is provided in an outlet of the passage as a damping valve. Thus, a damping force is generated in relation to displacement of the piston. The leaf valve is typically constituted by a plurality of laminated leaves, and the passage is opened when an outer peripheral portion of the leaf valve deforms in accordance with an upstream/downstream differential pressure. Accordingly, the leaf valve tends to generate excessive damping force when a displacement speed of the piston is in a medium to high speed region.

JPH09-291961A, published by the Japan Patent Office in 1997, proposes a damping valve in which an inner periphery of the leaf valve is supported elastically by a coil spring rather than being fixed, whereby a damping force characteristic of the leaf valve is improved.

Referring to FIG. 16, in a shock absorber provided with this damping valve, a tubular piston nut N is screwed to a tip end of a piston rod R penetrating a piston P. A leaf valve L serving as the damping valve opposes an outlet of a passage Po penetrating the piston P, and the leaf valve L is attached to an outer periphery of the piston nut N to be capable of displacing in an axial direction. Meanwhile, a coil spring S supported on the piston nut N at one end keeps an inner peripheral portion of the leaf valve L in elastic contact with the piston via a pressing member M attached slidably to an outer periphery of the piston nut N.

When the piston P moves upward in the figure, working oil flows through the passage Po from an oil chamber above the piston P to an oil chamber below the piston P, and a damping force is generated by a flow resistance of the leaf valve L provided at the outlet. When the piston speed is in a low speed region, an outer peripheral portion of the leaf valve L deflects downward in the figure using the inner peripheral portion, which is supported by the pressing member M, as a fulcrum. When the piston speed reaches a medium to high speed region, a pressure of the working oil passing through the passage Po exceeds an elastic force of the coil spring S, and therefore the leaf valve L displaces axially downward from the piston P together with the pressing member M. As a result, the leaf valve L opens widely, thereby ensuring that the damping force does not increase excessively. In other words, as shown in FIG. 17, the damping force increases smoothly relative to the piston speed even in the medium to high piston speed region of the piston speed.

SUMMARY OF THE INVENTION

This damping valve is effective in suppressing the damping force that is generated in the medium to high speed region of the piston speed. However, at piston speeds in or above the medium speed region, the entire leaf valve L retreats, and therefore the damping force characteristic is identical in the medium speed region and the high speed region of the piston speed. Hence, when a spring load is set to obtain a favorable damping force in the medium speed region, the damping force may be insufficient in the high speed region.

It is therefore an object of this invention to provide a damping force generating mechanism with which different damping force characteristics are obtained in a medium speed region and a high speed region of a piston speed so that a favorable damping force is obtained in both the medium speed region and the high speed region.

To achieve the object described above, this invention provides a damping force generating mechanism for a hydraulic shock absorber in which a first fluid chamber and a second fluid chamber are defined by a valve disk, comprising a port formed in the valve disk to cause a fluid to flow from the first fluid chamber to the second fluid chamber, a damping valve that closes the port on the second fluid chamber side, a passage that connects the first fluid chamber to the port, a throttle valve that reduces a flow sectional area of the passage in accordance with a pressure of the first fluid chamber, a pressure chamber that exerts an oppositely oriented pressure to the pressure of the first fluid chamber on the throttle valve, and a plate spring that biases the throttle valve in an opposite direction to the pressure of the first fluid chamber.

The details as well as other features and advantages of this invention are set forth in the remainder of the specification and are shown in the accompanying drawings.

DESCRIPTION OF THE PREFERRED EMBODIMENTS

Figure 1:
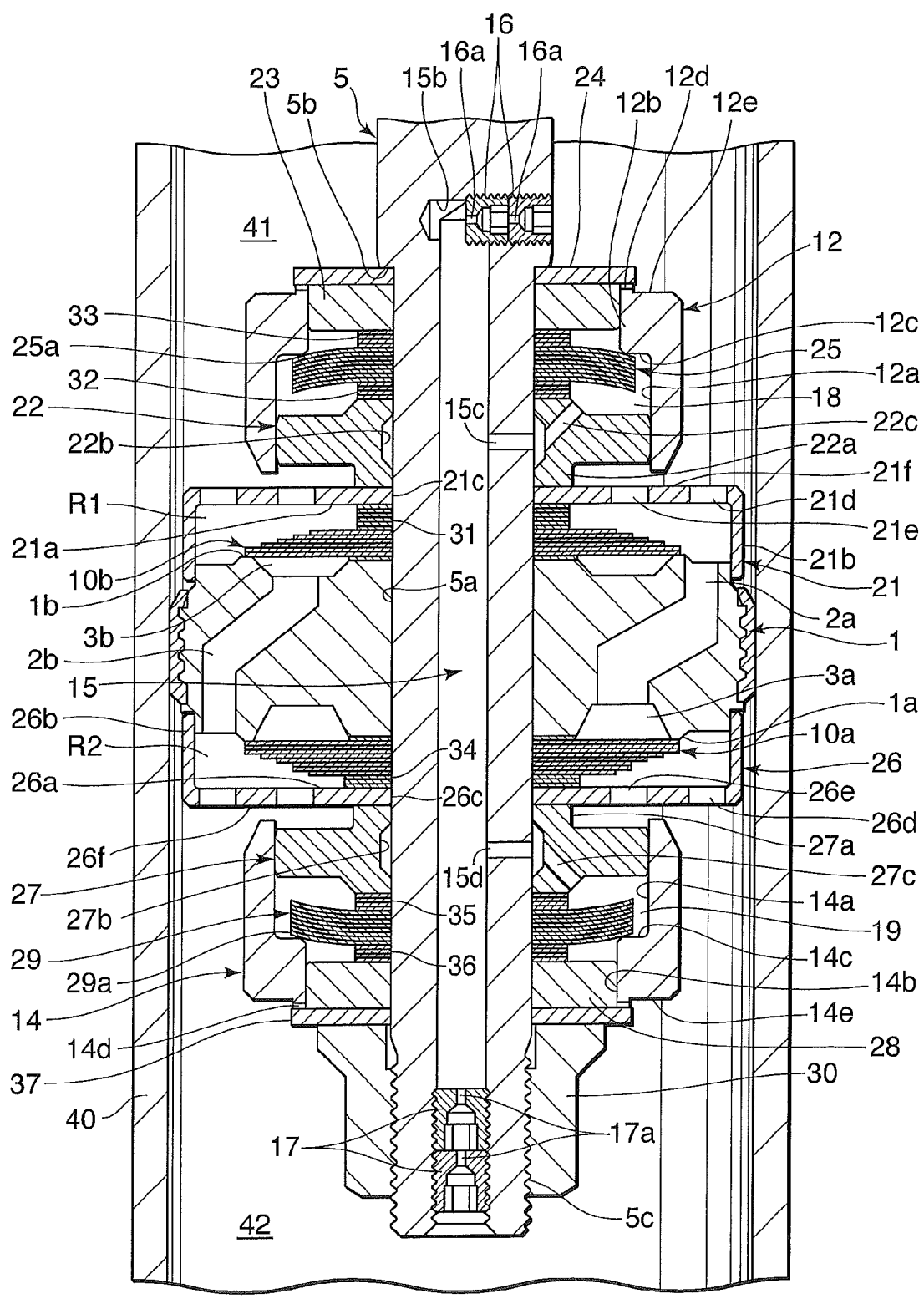
FIG. 1 is a longitudinal sectional view of essential parts of a hydraulic shock absorber including a damping force generating mechanism according to this invention.

Referring to FIG. 1 of the drawings, a hydraulic shock absorber for a vehicle comprises a cylinder 40, a piston 1 serving as a valve disk that is accommodated in the cylinder 40 to be free to slide, and a piston rod 5 that is joined to the piston 1 so as to project from the cylinder 40 in an axial direction.

A small diameter portion 5a is formed on a tip end of the piston rod 5 via a step 5b. The small diameter portion 5a penetrates the center of the piston 1, and a piston nut 30 is screwed to a male screw portion 5c formed on a penetration end. An outer periphery of the piston 1 slides on an inner peripheral surface of the cylinder 40.

The interior of the cylinder 40 is divided by the piston 1 into an oil chamber 41 located above the piston 1 and an oil chamber 42 located below the piston 1. Working oil is sealed into both the oil chamber 41 and the oil chamber 42. A reservoir or an air chamber that compensates for volume variation in the cylinder 40 due to expansion and contraction of the piston rod 5 relative to the cylinder 40 is provided on an inner side or an outer side of the cylinder 40 as a well known constitution of a hydraulic shock absorber.

The piston 1 is formed with ports 2a and 2b that respectively penetrate the piston 1 vertically in a diagonal direction, an annular groove 3a that forms an outlet of the port 2a, and an annular groove 3b that forms an outlet of the port 2b.

An expansion side damping valve 10a opposing the annular groove 3a is provided below the piston 1. A contraction side damping valve 10b opposing the annular groove 3b is provided above the piston 1. The expansion side damping valve 10a and the contraction side damping valve 10b are both constituted by leaf valves formed by laminating a plurality of leaves. The expansion side damping valve 10a closes the annular groove 3a when an outer peripheral portion thereof is seated on a valve seat 1a formed on the piston 1 on an outer periphery of the annular groove 3a. The contraction side damping valve 10b closes the annular groove 3b when an outer peripheral portion thereof is seated on a valve seat 1b formed on the piston 1 on an outer periphery of the annular groove 3b.

An inlet of the port 2a is formed on an outer side of the annular groove 3b so as not to be blocked by the contraction side damping valve 10b. An inlet of the port 2b is formed on an outer side of the annular groove 3a in order not to be blocked by the expansion side damping valve 10a. It should be noted, however, that as long as the inlets of the ports 2a and 2b are not blocked by the expansion side damping valve 10a and the contraction side damping valve 10b, the respective locations and shapes thereof are not limited to those described above. For example, the inlets of the ports 2a and 2b may be disposed on an identical circumference such that the valve seats 1a and 1b are formed in a so-called petal shape.

A plurality of cutouts are formed respectively in the outer peripheral portion of the expansion side damping valve 10a seated on the valve seat 1a and the outer peripheral portion of the contraction side damping valve 10b seated on the valve seat 1b. Alternatively, well known orifices are formed in the valve seats 1a and 1b by punching.

The inlet of the port 2a and a top of the contraction side damping valve 10b are covered by a cylindrical partitioning member 21. The partitioning member 21 is constituted by a bottom portion 21a and a tube portion 21b extending in an axial direction from an outer periphery of the bottom portion 21a. A hole portion 21c penetrated by the small diameter portion 5a of the piston rod 5 is formed in the center of the bottom portion 21a. The bottom portion 21a contacts a central portion of the contraction side damping valve 10b via a washer 31, and a tip end of the tube portion 21b is fitted to the outer periphery of the piston 1. A chamber R1 is defined between the inlet of the port 2a and the top of the contraction side damping valve 10b by the partitioning member 21 constituted in this manner. A plurality of through holes 21e connecting the oil chamber 41 to the chamber R1 are formed in the bottom portion 21a. Further, a plurality of through holes 21d connecting the oil chamber 41 to the chamber R1 are formed in the bottom portion 21a on an outer side of the plurality of through holes 21e.

A throttle valve 12 is provided above the partitioning member 21 opposite the plurality of through holes 21e.

The throttle valve 12 is formed in a tubular shape, and includes a small diameter portion 12b which is fitted to an outer periphery of a first holder 23 fixed to an outer periphery of the small diameter portion 5a of the piston rod 5, and a large diameter portion 12a connected to the small diameter portion 12b via a step 12c. The large diameter portion 12a is fitted to an outer periphery of a second holder 22 fixed to the outer periphery of the small diameter portion 5a of the piston rod 5. The throttle valve 12 is supported by the first holder 23 and the second holder 22 to be free to slide in an axial direction, i.e. a vertical direction of the figure. When the throttle valve 12 slides downward in the figure, a tip end of the large diameter portion 12a is seated on an annular seat portion 21f formed between the through holes 21e and the through holes 21d provided in the bottom portion 21a of the partitioning member 21.

The throttle valve 12 is prevented from sliding upward in the figure beyond a fixed position by a stopper 24 sandwiched between the step 5b of the piston rod 5 and the first holder 23. A plurality of radial direction grooves 12d are formed in a part of the throttle valve 12 that contacts the stopper 24. The grooves 12d are formed so that an oil pressure of the oil chamber 41 is exerted on an entire upper surface 12e of the throttle valve 12 even when the throttle valve 12 is in contact with the stopper 24.

Further, a pressure chamber 18 is defined between the first holder 23 and the second holder 22 by the throttle valve 12. A plate spring 25 formed by laminated annular plates is accommodated in the pressure chamber 18. The plate spring 25 is fitted to the outer periphery of the small diameter portion 5a of the piston rod 5 such that an outer peripheral portion thereof contacts the step 12c of the throttle valve 12 from below. The plate spring 25 contacts the second holder 22 via a washer 32 and contacts the first holder 23 via a washer 33. The plate spring 25 contacts the step 12c while applying an initial load thereto in advance.

A plurality of cutouts 25a are formed in a part of the plate spring 25 that contacts the step 12c. The cutouts 25a are formed to secure communication between the pressure chamber 18 and a space defined by the plate spring 25, the throttle valve 12, and the first holder 23. By forming the cutouts 25a, equal pressure is applied to the upper and lower surfaces of the plate spring 25. The number of annular plates forming the plate spring 25 may be set arbitrarily. The plate spring 25 may also be formed by a single annular plate.

Hence, the contraction side damping valve 10b, the washer 31, the partitioning member 21, the second holder 22, the washer 32, the plate spring 25, the washer 33, the first holder 23, and the stopper 24 are sandwiched between the piston 1 and the step 5b of the piston rod 5.

The second holder 22 includes a thick inner peripheral portion 22a which is fitted to the outer periphery of the small diameter portion 5a of the piston rod 5. An annular groove 22b is formed in an inner periphery of the inner peripheral portion 22a. A passage 22c connecting the annular groove 22b to the pressure chamber 18 penetrates the inner peripheral portion 22a.

A connecting passage 15 that connects the oil chamber 41 to the oil chamber 42 without passing through the damping valves 10a, 10b is formed in the small diameter portion 5a of the piston rod 5 in a longitudinal direction. One end of the connecting passage 15 communicates with the oil chamber 41 via two continuous orifices 16a. The other end of the connecting passage 15 communicates with the oil chamber 42 via two continuous orifices 17a.

The orifices 16a are formed inside a plug 16 which is screwed into a lateral hole 15b of the piston rod 15 formed on the upper end of the connecting passage 15 to face the oil chamber 41. The orifices 17a are formed inside a plug 17 which is screwed into a lower end of the connecting passage 15 facing the oil chamber 42. With this constitution, a pressure of the connecting passage 15 is kept substantially constant regardless of a stroke direction and a stroke speed of the piston 1. To keep the pressure of the connecting passage 15 substantially constant, in this embodiment the two orifices 16a and the two orifices 17a are provided on either end of the connecting passage 15, but the diameter and number of the orifices 16a and 17a may be modified as required. If possible, the orifices 16a and the orifices 17a may be formed directly in the connecting passage 15 and the lateral hole 15b.

The annular groove 22b communicates with the connecting passage 15 at all times via a through hole 15c formed in the small diameter portion 5a of the piston rod 5. The pressure of the pressure chamber 18, which communicates with the annular groove 22b via the passage 22c, is therefore kept substantially constant regardless of the stroke direction and stroke speed of the piston 1.

The throttle valve 12 constituted as described above functions as follows in relation to an expansion side stroke of the piston 1.

During the expansion side stroke of the piston 1, damping force is basically generated by the expansion side damping valve 10a. When the expansion side damping valve 10a strokes to the expansion side while the piston 1 is at an extremely low speed, the expansion side damping valve 10a is not lifted from the valve seat 1a, and therefore a small amount of working oil flows out of the port 2a into the oil chamber 42 via the cutouts formed in the outer periphery or the orifices punched into the valve seat 1a. When the expansion side stroke speed of the piston 1 increases, the expansion side damping valve 10a is elastically deformed such that the outer peripheral portion thereof is lifted from the valve seat 1a, and therefore working oil flows out of the port 2a into the oil chamber 42 via a gap between the expansion side damping valve 10a and the valve seat 1a.

When the stroke speed of the piston 1 enters a medium speed region, the elastic deformation of the expansion side damping valve 10a increases in accordance with the increase in the stroke speed such that the amount of working oil flowing into the oil chamber 42 from the port 2a increases. In this state, the expansion side damping valve 10a generates expansion side damping force corresponding to the elastic deformation.

When the stroke speed of the piston 1 reaches a high speed region, a differential pressure between the pressure of the oil chamber 41, which acts on the throttle valve 12 in a downward direction of the figure, and the pressure of the pressure chamber 18, which acts on the throttle valve 12 in an upward direction of the figure, exceeds a biasing force of the plate spring 25, and therefore the throttle valve 12 displaces downward in the figure. As a result, a lower end of the large diameter portion 12a of the throttle valve 12 approaches the annular seat portion 21f of the partitioning member 21 such that a flow passage for the working oil that flows to the port 2a from the oil chamber 41 via the through holes 21e is narrowed. When the stroke speed of the piston 1 increases even further, the lower end of the large diameter portion 21a is seated on the annular seat portion 21f such that the flow of working oil from the oil chamber 41 to the port 2a via the through holes 21e is blocked. Thereafter, the entire amount of the working oil that flows to the port 2a from the oil chamber 41 passes through the through holes 21d, and as a result, the expansion side damping force is increased markedly in accordance with a resistance generated by the contracted flow through the through holes 21d.

Figure 2:
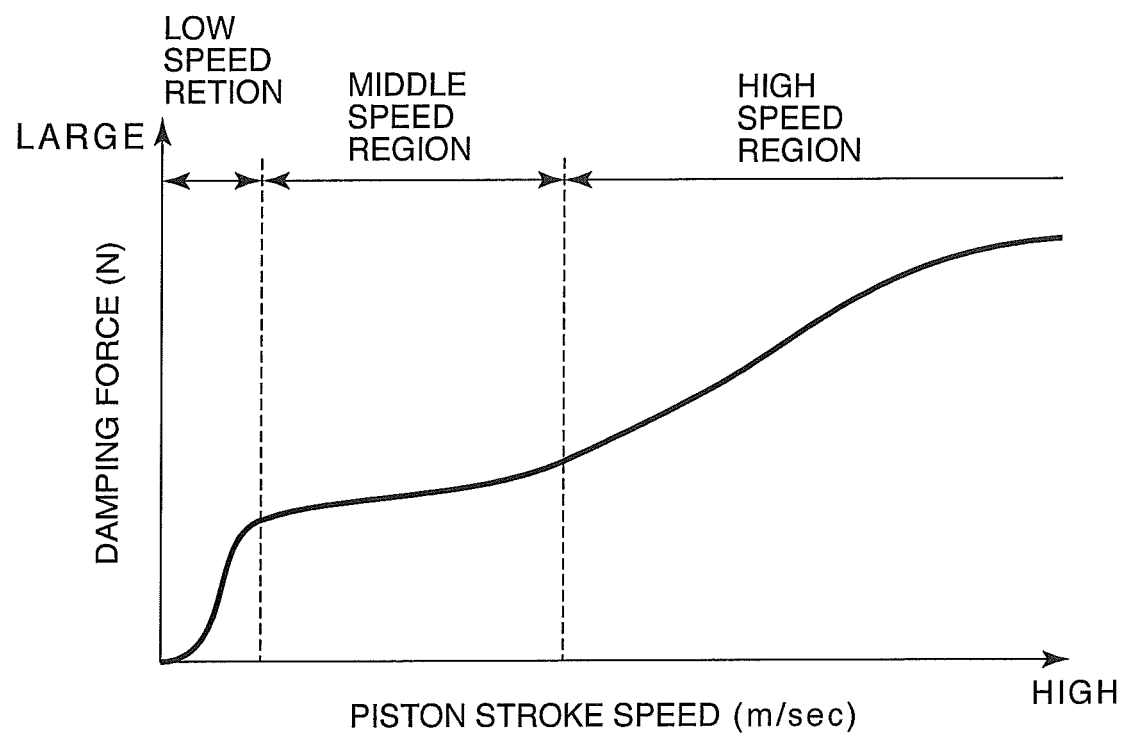
FIG. 2 is a diagram showing a damping characteristic of the damping force generating mechanism.

Referring to FIG. 2, in this hydraulic shock absorber, the expansion side damping force increases rapidly when the expansion side damping valve 10a opens during the expansion side stroke of the piston 1 as the stroke speed increases from the low speed region toward the medium speed region. In the medium speed region where the expansion side damping valve 10a is open, the expansion side damping valve 10a increases the expansion side damping force gently in accordance with the stroke speed. When the stroke speed enters the high speed region, the expansion side damping force increases further due to the contracted flow action generated by the throttle valve 12.

As described above, the expansion side damping valve 10a and the throttle valve 12 constitute an expansion side damping force generating mechanism of the hydraulic shock absorber.

Meanwhile, the hydraulic shock absorber also includes a contraction side damping force generating mechanism constituted by the contraction side damping valve 10b described above and a throttle valve 14 to be described below.

Returning to FIG. 1, the inlet of the port 2b and a bottom of the contraction side damping valve 10a are covered by a cylindrical partitioning member 26. The partitioning member 26 is constituted by a bottom portion 26a and a tube portion 26b extending in an axial direction from an outer periphery of the bottom portion 26a. A hole portion 26c penetrated by the small diameter portion 5a of the piston rod 5 is formed in the center of the bottom portion 26a. The bottom portion 26a contacts a central portion of the expansion side damping valve 10a via a washer 34, and a tip end of the tube portion 26b is fitted to the outer periphery of the piston 1. A chamber R2 is defined between the inlet of the port 2b and the bottom of the expansion side damping valve 10a by the partitioning member 26 constituted in this manner. A plurality of through holes 26e connecting the oil chamber 42 to the chamber R2 are formed in the bottom portion 26a. Further, a plurality of through holes 26d connecting the oil chamber 42 to the chamber R2 are formed in the bottom portion 26a on an outer side of the plurality of through holes 26e.

The throttle valve 14 is provided below the partitioning member 26 opposite the plurality of through holes 26e.

The throttle valve 14 is formed in a tubular shape, and includes a small diameter portion 14b which is fitted to an outer periphery of a first holder 28 fixed to the outer periphery of the small diameter portion 5a of the piston rod 5, and a large diameter portion 14a connected to the small diameter portion 14b via a step 14c. The large diameter portion 14a is fitted to an outer periphery of a second holder 27 fixed to the outer periphery of the small diameter portion 5a of the piston rod 5. The throttle valve 14 is supported by the first holder 28 and the second holder 27 to be free to slide in the axial direction, i.e. the vertical direction of the figure. When the throttle valve 14 slides upward in the figure, a tip end of the large diameter portion 14a is seated on an annular seat portion 26f formed between the through holes 26e and the through holes 26d provided in the bottom portion 26a of the partitioning member 26.

The throttle valve 14 is prevented from sliding downward in the figure beyond a fixed position by a stopper 37 sandwiched between the piston nut 30 and the first holder 28. A plurality of radial direction grooves 14d are formed in a part of the throttle valve 14 that contacts the stopper 37. The grooves 14d are formed so that an oil pressure of the oil chamber 42 is exerted on an entire lower surface 14e of the throttle valve 14 even when the throttle valve 14 is in contact with the stopper 37. It should be noted that the stopper 37 may be formed integrally with the piston nut 30.

Further, a pressure chamber 19 is defined between the first holder 28 and the second holder 27 by the throttle valve 14. A plate spring 29 formed by laminated annular plates is accommodated in the pressure chamber 19. The plate spring 29 is fitted to the outer periphery of the small diameter portion 5a of the piston rod 5 such that an outer peripheral portion thereof contacts the step 14c of the throttle valve 14 from above. The plate spring 29 contacts the second holder 27 via a washer 35 and contacts the first holder 28 via a washer 36. The plate spring 29 contacts the step 14c while applying an initial load thereto in advance.

A plurality of cutouts 29a are formed in a part of the plate spring 29 that contacts the step 14c. The cutouts 29a are formed to secure communication between the pressure chamber 19 and a space defined by the plate spring 29, the throttle valve 14, and the first holder 28. By forming the cutouts 29a, equal pressure is applied to the upper and lower surfaces of the plate spring 29. The number of annular plates forming the plate spring 29 may be set arbitrarily. The plate spring 29 may also be formed by a single annular plate.

Hence, the expansion side damping valve 10a, the washer 34, the partitioning member 26, the second holder 27, the washer 35, the plate spring 29, the washer 36, the first holder 28, and the stopper 37 are sandwiched between the piston 1 and the piston nut 30.

The second holder 27 includes a thick inner peripheral portion 27a which is fitted to the outer periphery of the small diameter portion 5a of the piston rod 5. An annular groove 27b is formed in an inner periphery of the inner peripheral portion 27a. A passage 27c connecting the annular groove 27b to the pressure chamber 19 penetrates the inner peripheral portion 27a.

The annular groove 27b communicates with the connecting passage 15 at all times via a through hole 15d formed in the small diameter portion 5a of the piston rod 5. The pressure of the pressure chamber 19, which communicates with the annular groove 27b via the passage 27c, is therefore kept substantially constant regardless of the stroke direction and stroke speed of the piston 1.

The throttle valve 14 described above is constituted similarly to the throttle valve 12. The washer 31, partitioning member 21, second holder 22, washer 32, plate spring 25, washer 33, first holder 23, throttle valve 12, and stopper 24 disposed in the oil chamber 41 above the piston 1 are constituted identically to the washer 34, partitioning member 26, second holder 27, washer 35, plate spring 29, washer 36, first holder 28, throttle valve 14, and stopper 37 disposed in the oil chamber 42 below the piston 1, and the respective components are disposed in vertical symmetry about the piston 1.

The throttle valve 14 functions as follows in relation to a contraction side stroke of the piston 1.

During the contraction side stroke of the piston 1, damping force is basically generated by the contraction side damping valve 10b. When the contraction side damping valve 10b strokes to the contraction side while the piston 1 is at an extremely low speed, the contraction side damping valve 10b is not lifted from the valve seat 1b, and therefore a small amount of working oil flows out of the port 2b into the oil chamber 41 via the cutouts formed in the outer periphery or the orifices punched into the valve seat 1b. When the contraction side stroke speed of the piston 1 increases, the contraction side damping valve 10b is elastically deformed such that the outer peripheral portion thereof is lifted from the valve seat 1b, and therefore working oil flows out of the port 2b into the oil chamber 41 via a gap between the contraction side damping valve 10b and the valve seat 1b.

When the stroke speed of the piston 1 enters the medium speed region, the elastic deformation of the contraction side damping valve 10b increases in accordance with the increase in the stroke speed such that the amount of working oil flowing into the oil chamber 41 from the port 2b increases. In this state, the contraction side damping valve 10b generates contraction side damping force corresponding to the elastic deformation.

When the stroke speed of the piston 1 reaches the high speed region, a differential pressure between the pressure of the oil chamber 42, which acts on the throttle valve 14 in the upward direction of the figure, and the pressure of the pressure chamber 19, which acts on the throttle valve 14 in the downward direction of the figure, exceeds a biasing force of the plate spring 29, and therefore the throttle valve 14 displaces upward in the figure. As a result, an upper end of the large diameter portion 14a of the throttle valve 14 approaches the annular seat portion 26f of the partitioning member 26 such that a flow passage for the working oil that flows to the port 2b from the oil chamber 42 via the through holes 26e is narrowed. When the stroke speed of the piston 1 increases even further, the upper end of the large diameter portion 14a is seated on the annular seat portion 26f such that the flow of working oil from the oil chamber 42 to the port 2b via the through holes 26e is blocked. Thereafter, the entire amount of the working oil that flows to the port 2b from the oil chamber 42 passes through the through holes 26d, and as a result, the contraction side damping force increases markedly due to a resistance generated by the contracted flow through the through holes 26d.

Referring to FIG. 2, in this hydraulic shock absorber, the contraction side damping force increases rapidly when the contraction side damping valve 10b opens during the contraction side stroke of the piston 1 as the stroke speed increases from the low speed region toward the medium speed region. In the medium speed region where the contraction side damping valve 10b is open, the contraction side damping valve 10b increases the contraction side damping force gently in accordance with the stroke speed. When the stroke speed enters the high speed region, the contraction side damping force increases further due to the contracted flow action generated by the throttle valve 14.

Hence, the hydraulic shock absorber generates markedly greater damping force in the high speed region than in the medium speed region during both the expansion side stroke and the contraction side stroke of the piston 1. Therefore, when the hydraulic shock absorber is applied as a vehicle hydraulic shock absorber interposed between a vehicle body and a vehicle axle of a vehicle, favorable passenger comfort can be realized.

Further, when a large load is applied to the hydraulic shock absorber, the piston 1 strokes at a high speed and a large amplitude. By ensuring that a markedly larger damping force is generated in the high speed region than in the medium speed region, full extension and bottoming of the piston 1 are suppressed in such cases, and therefore shock generated by full extension and bottoming is prevented effectively.

In this hydraulic shock absorber, the throttle valves 12 and 14 are supported by the plate springs 25 and 29 having respective spring constants that can be set to be large. Therefore, a flow passage cross-section of the working oil passing through the through holes 21e and 26e can be reduced gradually in accordance with the pressure increase in the oil chamber 41 and the oil chamber 42 from a maximum retreat position in which the throttle valves 12 and 14 respectively contact the stoppers 24 and 37 such that the flow passage cross-section of the working oil passing through the through holes 21e and 26e is maintained at a maximum to a blocking position in which the throttle valves 12 and 14 respectively contact the annular seat portions 21f and 26f such that the working oil passing through the through holes 21e and 26e is blocked. Hence, as shown in FIG. 2, the damping force generated in the high speed region, instead of being increased rapidly, can be increased gradually at a larger increase rate relative to the stroke speed increase in the piston 1 than the increase rate of the damping force generated in the medium speed region.

The throttle valves 12 and 14 are preferably supported by the plate springs 25 and 29, the respective spring constants of which can be set large, to ensure that hysteresis does not occur in opening variation of the throttle valves 12 and 14. By eliminating hysteresis from the opening variation of the throttle valves 12 and 14, the hydraulic shock absorber can exhibit a planned damping force characteristic at all times.

Further, the throttle valves 12 and 14 are preferably supported by the plate springs 25 and 29, the respective spring constants of which can be set large, to prevent rapid displacement of the throttle valves 12 and 14 and prevent the throttle valves 12 and 14 from colliding with the annular seat portions 21f and 26f as a result of this rapid displacement. Accordingly, noise generated in the hydraulic shock absorber when the throttle valves 12 and 14 collide with the annular seat portions 21f and 26f can be suppressed.

An initial motion timing of the throttle valves 12 and 14 may be set arbitrarily by appropriately selecting a pressure-receiving surface area of the throttle valves 12 and 14, the spring constants of the plate springs 25 and 29, and the number and diameter of the orifices 16a and 17a.

The plate springs 25 and 29 are formed with a shorter axial direction length than a coil spring having an equivalent spring constant so that they can be accommodated inside the pressure chambers 18 and 19. Therefore, a distance from the step 5b to the piston nut 30 required to support the piston 1, the expansion side damping force generating mechanism, and the contraction side damping force generating mechanism can be shortened. This distance is preferably made short in order to secure an effective stroke length of the hydraulic shock absorber.

In this hydraulic shock absorber, the throttle valve 12 is constituted to block only the flow passages passing through the through holes 21e, from among the flow passages extending from the oil chamber 41 to the port 2a. Further, the throttle valve 14 is constituted to block only the flow passages passing through the through holes 26e, from among the flow passages extending from the oil chamber 42 to the port 2b. Setting is preferably performed in this manner to secure a flow passage when the piston 1 strokes in the high speed region and stabilize the generated damping force. However, the flow passage need not be bifurcated to the through holes 21d, 21e, 26d and 26e, and instead, the throttle valve 12 may narrow the flow passage cross-section of a single flow passage extending from the oil chamber 41 to the port 2a while the throttle valve 14 narrows the flow passage cross-section of a single flow passage extending from the oil chamber 42 to the port 2b. In this case, however, the throttle valves 12 and 14 must be formed such that the flow passage is not blocked even in a position where the flow passage cross-section is narrowed to a maximum extent.

In the hydraulic shock absorber, the expansion side damping force and the contraction side damping force are set to have identical characteristics but may be set to have different characteristics. For example, the expansion side stroke speed and the contraction side stroke speed serving as the respective initial motion timings of the throttle valves 12 and 14 may be set at different values.

The throttle valve 12 displaces in a state where a base end thereof is supported by the first holder 23 and the tip end thereof is supported by the second holder 22. The throttle valve 14 displaces in a state where a base end thereof is supported by the first holder 28 and the tip end thereof is supported by the second holder 27. Hence, the throttle valves 12 and 14 displace smoothly on the basis of a stable support condition, whereby the hydraulic shock absorber exhibits a stable damping force characteristic. Furthermore, this support structure facilitates assembly of the throttle valves 12 and 14. However, the support structure for the throttle valves 12 and 14 may be subjected to desired design modifications.

Figure 3:
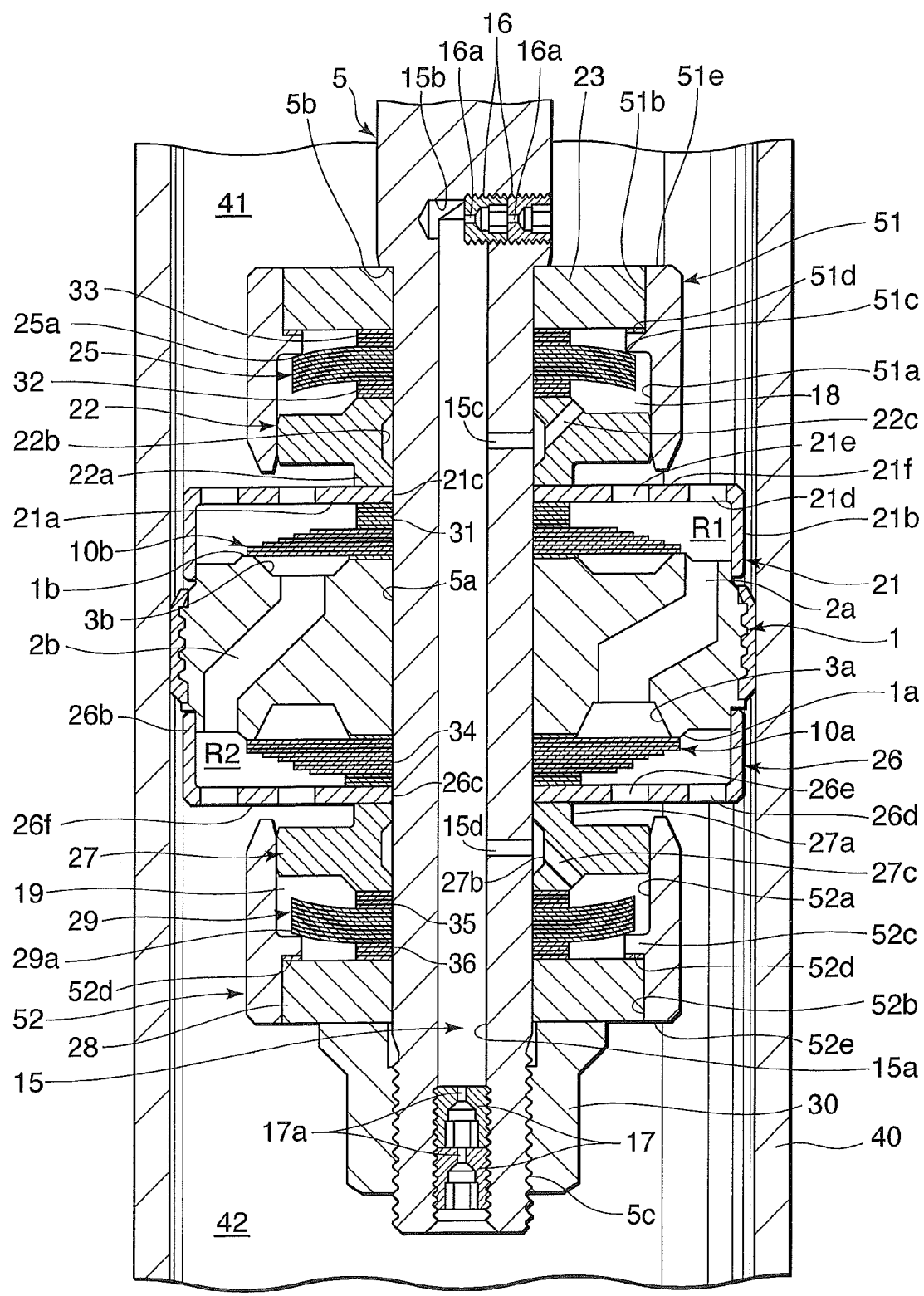
FIG. 3 is a longitudinal sectional view of essential parts of a shock absorber including a damping force generating mechanism according to a second embodiment of this invention.

Referring to FIG. 3, a second embodiment of this invention will be described.

A hydraulic shock absorber according to this embodiment employs throttle valves 51 and 52 in place of the throttle valves 12 and 14 according to the first embodiment. All other members are constituted identically to their counterparts in the first embodiment.

The throttle valve 51 comprises a small diameter portion 51b which is fitted to the outer periphery of the first holder 23 fixed to the outer periphery of the small diameter portion 5a of the piston rod 5, a large diameter portion 51a which is fitted to the outer periphery of the second holder 22 fixed to the outer periphery of the small diameter portion 5a of the piston rod 5, and a spring support portion 51c that projects in a center direction between the small diameter portion 51b and the large diameter portion 51a.

The throttle valve 51 is supported by the first holder 23 and the second holder 22 to be free to slide in the axial direction, i.e. the vertical direction of the figure. When the throttle valve 51 slides downward in the figure, a tip end of the large diameter portion 12a is seated on the annular seat portion 21f formed between the through holes 21e and the through holes 21d provided in the bottom portion 21a of the partitioning member 21.

The throttle valve 51 defines the pressure chamber 18 between the first holder 23 and the second holder 22. The plate spring 25 formed by laminated annular plates is accommodated in the pressure chamber 18. The plate spring 25 is fitted to the outer periphery of the small diameter portion 5a of the piston rod 5 such that the outer peripheral portion thereof contacts the spring support portion 51c of the throttle valve 51 from below. The plate spring 25 is sandwiched between the second holder 22 and the first holder 23 via the washer 32 and the washer 33. The plate spring 25 contacts the spring support portion 51c while applying an initial load thereto in advance.

The plurality of cutouts 25a are formed in a part of the plate spring 25 that contacts the spring support portion 51c. The cutouts 25a are formed to secure communication between the pressure chamber 18 and a space defined by the plate spring 25, the throttle valve 51, and the first holder 23. By forming the cutouts 25a, equal pressure is applied to the upper and lower surfaces of the plate spring 25. The number of annular plates forming the plate spring 25 may be set arbitrarily. The plate spring 25 may also be formed by a single annular plate.

A plurality of grooves 51d are formed in a radial direction in a part of the spring support portion 51c that contacts the first holder 23. The grooves 51d are formed with the aim of applying the internal pressure of the pressure chamber 18 to the entire spring support portion 51c when the spring support portion 51c is in close contact with the first holder 23. Similarly to the first embodiment, the pressure of the connecting passage 15 is led into the pressure chamber 18.

The pressure of the oil chamber 41 acts downwardly on an upper surface 51e of the throttle valve 51, while the biasing force of the plate spring 25 and the pressure of the pressure chamber 18 act upwardly on the throttle valve 51 within the pressure chamber 18. As regards displacement of the throttle valve 51 in a separating direction from the annular seat portion 21f, when the spring support portion 51c contacts the first holder 23, further displacement of the throttle valve 51 is restricted. Therefore, the stopper 24 is omitted from this embodiment.

The throttle valve 52 is constituted identically to the throttle valve 51.

More specifically, the throttle valve 52 comprises a small diameter portion 52b which is fitted to the outer periphery of the first holder 28 fixed to the outer periphery of the small diameter portion 5a of the piston rod 5, a large diameter portion 52a which is fitted to the outer periphery of the second holder 27 fixed to the outer periphery of the small diameter portion 5a of the piston rod 5, and a spring support portion 52c that projects in a center direction between the small diameter portion 52b and the large diameter portion 52a.

The throttle valve 52 is supported by the first holder 28 and the second holder 27 to be free to slide in the axial direction, i.e. the vertical direction of the figure. When the throttle valve 52 slides upward in the figure, a tip end of the large diameter portion 52a is seated on the annular seat portion 26f formed between the through holes 26e and the through holes 26d provided in the bottom portion 26a of the partitioning member 26.

The throttle valve 52 defines the pressure chamber 19 between the first holder 28 and the second holder 27. The plate spring 29 formed by laminated annular plates is accommodated in the pressure chamber 19. The plate spring 29 is fitted to the outer periphery of the small diameter portion 5a of the piston rod 5 such that the outer peripheral portion thereof contacts the spring support portion 52c of the throttle valve 52 from below. The plate spring 29 is sandwiched between the second holder 27 and the first holder 28 via the washer 35 and the washer 36. The plate spring 29 contacts the spring support portion 52c while applying an initial load thereto in advance.

The plurality of cutouts 29a are formed in a part of the plate spring 29 that contacts the spring support portion 52c. The cutouts 29a are formed to secure communication between the pressure chamber 19 and a space defined by the plate spring 29, the throttle valve 52, and the first holder 28. By forming the cutouts 29a, equal pressure is applied to the upper and lower surfaces of the plate spring 29. The number of annular plates forming the plate spring 29 may be set arbitrarily. The plate spring 29 may also be formed by a single annular plate.

Grooves 52d are formed in a radial direction in a part of the spring support portion 52c that contacts the first holder 28. The grooves 52d are formed with the aim of applying the internal pressure of the pressure chamber 19 to the entire spring support portion 52c when the spring support portion 52c is in close contact with the first holder 28. Similarly to the first embodiment, the pressure of the connecting passage 15 is led into the pressure chamber 19.

The pressure of the oil chamber 42 acts upwardly on a lower surface 52e of the throttle valve 52, while the biasing force of the plate spring 29 and the pressure of the pressure chamber 19 act downwardly on the throttle valve 52 within the pressure chamber 19. As regards displacement of the throttle valve 52 in a separating direction from the annular seat portion 26f, when the spring support portion 52c contacts the first holder 28, further displacement of the throttle valve 52 is restricted. Therefore, the stopper 37 is omitted from this embodiment.

In this embodiment, similarly to the first embodiment, markedly greater damping force than that of the medium speed region of the piston 1 can be generated in the high speed region. Therefore, when the hydraulic shock absorber is applied as a vehicle hydraulic shock absorber interposed between a vehicle body and a vehicle axle of a vehicle, favorable passenger comfort can be realized in the vehicle.

According to this embodiment, the stoppers 24 and 37 can be omitted, leading to a reduction in the number of components in comparison with the first embodiment.

Figure 4:
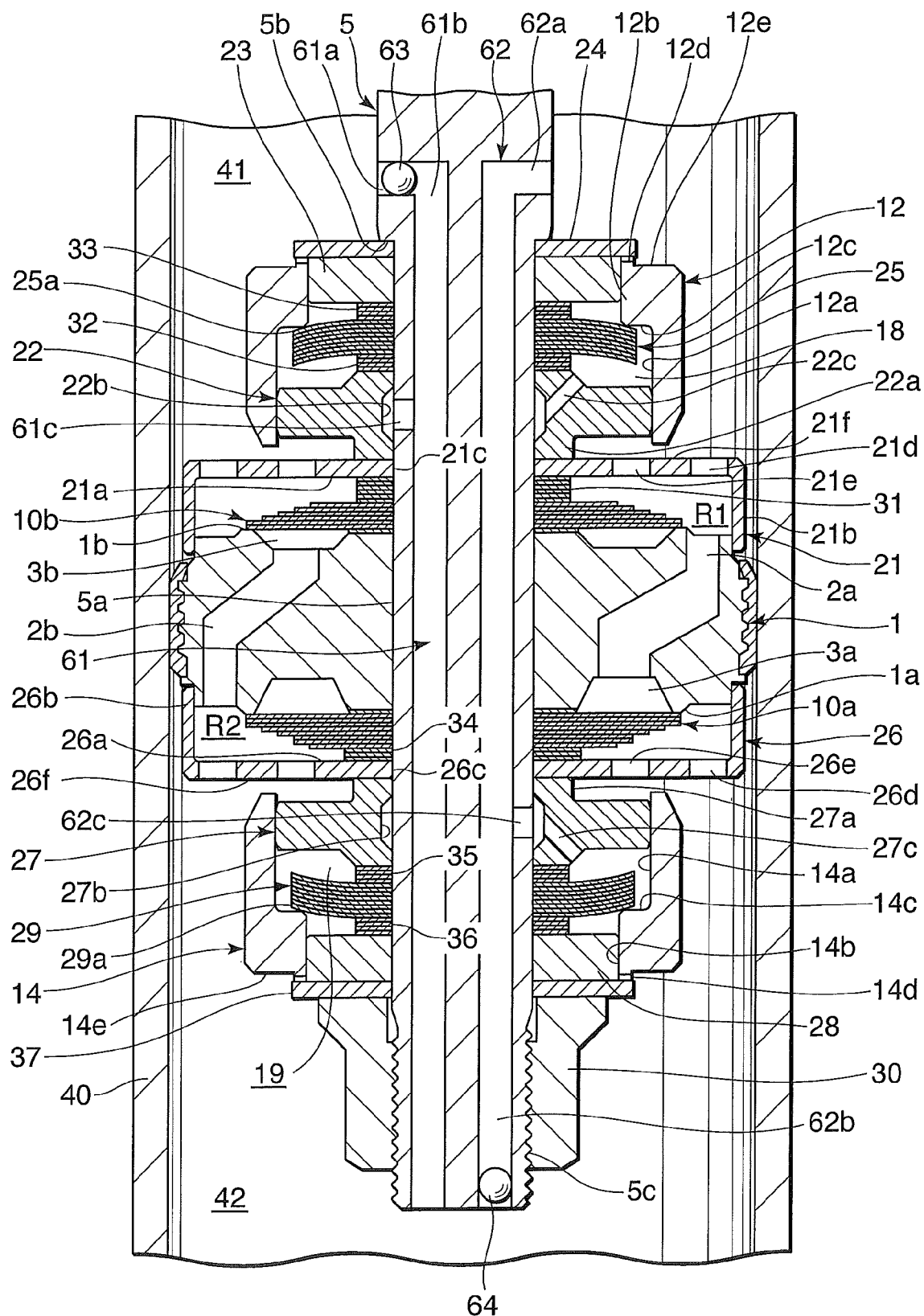
FIG. 4 is a longitudinal sectional view of essential parts of a shock absorber including a damping force generating mechanism according to a third embodiment of this invention.

Referring to FIG. 4, a third embodiment of this invention will be described.

In a hydraulic shock absorber according to this embodiment, the pressure of the oil chamber 42 is led into the pressure chamber 18, which is constituted similarly to that of the first embodiment. Likewise, the pressure of the oil chamber 41 is led into the pressure chamber 19, which is constituted similarly to that of the first embodiment.

Therefore, instead of the connecting passage 15 according to the first embodiment, two substantially parallel connecting passages 61 and 62 are formed in the small diameter portion 5a of the piston rod 5.

The connecting passage 61 is formed such that one end thereof opens onto the oil chamber 42 at the tip end of the small diameter portion 5a of the piston rod 5 and another end thereof communicates with a lateral hole 61a formed in a radial direction above the small diameter portion 5a of the piston rod 5. The lateral hole 61a opens onto the oil chamber 41, but a plug 63 is press-fitted into the lateral hole 61a, and therefore the connecting passage 61 is blocked from the oil chamber 41 and communicates only with the oil chamber 42.

The annular groove 22b of the second holder 22 communicates with the connecting passage 61 via a through hole 61c formed in the small diameter portion 5a of the piston rod 5. As a result, the pressure chamber 18 communicates with the oil chamber 42 at all times.

The connecting passage 62 is formed such that one end thereof opens onto the oil chamber 42 at the tip end of the small diameter portion 5a of the piston rod 5 and another end thereof communicates with a lateral hole 62a formed in a radial direction above the small diameter portion 5a of the piston rod 5. The lateral hole 62a opens onto the oil chamber 42. Meanwhile, a plug 64 is press-fitted into an opening portion of the connecting passage 62 opening onto the oil chamber 42, and therefore the connecting passage 62 is blocked from the oil chamber 42 and communicates only with the oil chamber 41.

The annular groove 27b of the second holder 27 communicates with the connecting passage 62 via a through hole 62c formed in the small diameter portion 5a of the piston rod 5. As a result, the pressure chamber 19 communicates with the oil chamber 41 at all times.

With this constitution, the pressure of the pressure chamber 18, which acts on the throttle valve 12 upwardly in the figure, is equal to the pressure of the oil chamber 42, and the pressure of the pressure chamber 19, which acts on the throttle valve 14 downwardly in the figure, is equal to the pressure of the oil chamber 41. Therefore, during the expansion side stroke of the piston 1, a resistance pressure that acts to close the throttle valve 12 in the high speed region is smaller than that of the first embodiment, and as a result, the throttle valve 12 can be caused to generate greater damping force under the plate spring 25, which has an identical spring constant.

Further, during the contraction side stroke of the piston 1, a resistance pressure that acts to close the throttle valve 14 in the high speed region is smaller than that of the first embodiment, and as a result, the throttle valve 14 can be caused to generate greater damping force under the plate spring 29, which has an identical spring constant.

Figure 5:
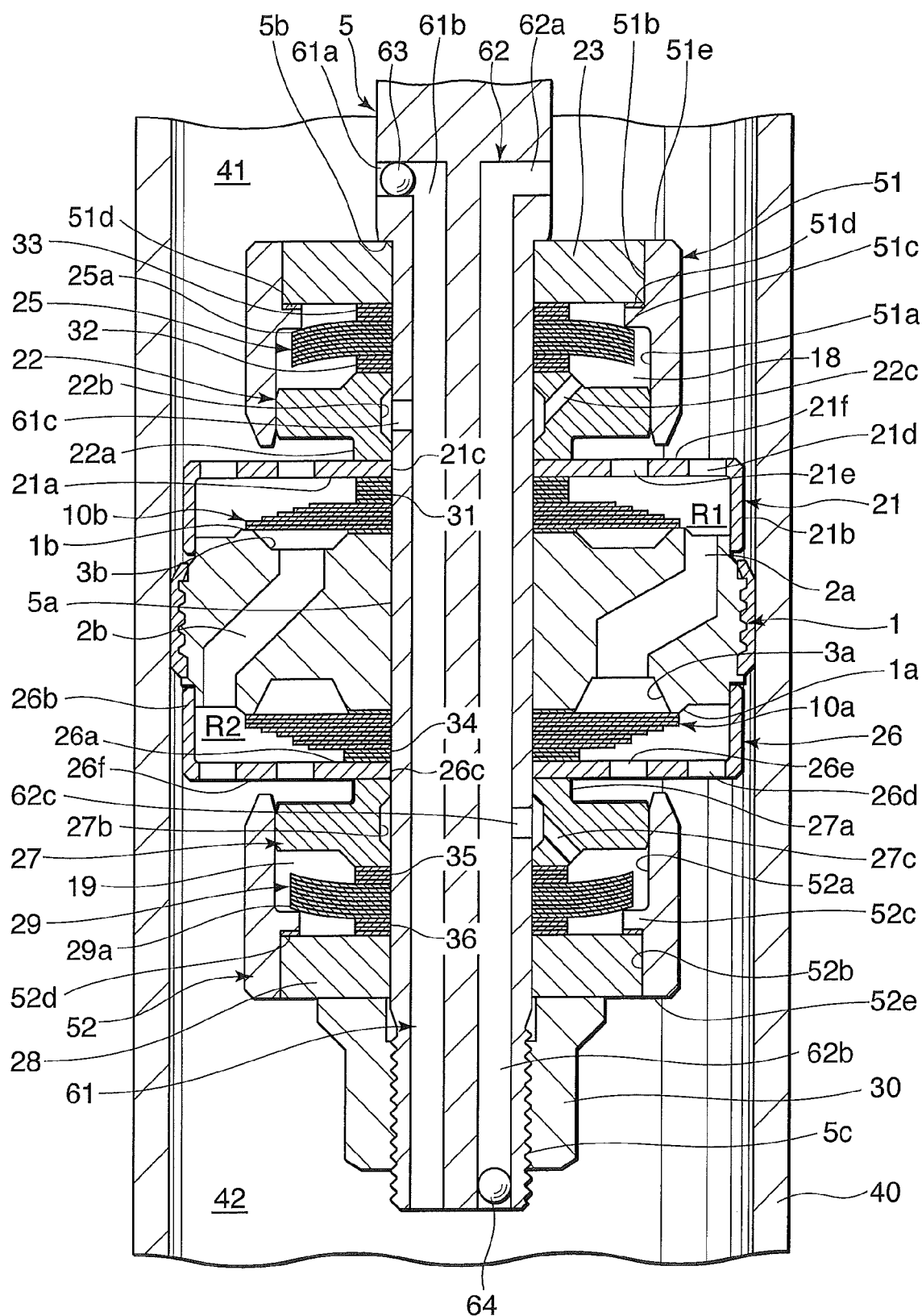
FIG. 5 is a longitudinal sectional view of essential parts of a shock absorber including a damping force generating mechanism according to a fourth embodiment of this invention.

Referring to FIG. 5, a fourth embodiment of this invention will be described.

In a hydraulic shock absorber according to this embodiment, the pressure of the oil chamber 42 is led into the pressure chamber 18, which is constituted similarly to that of the second embodiment. Likewise, the pressure of the oil chamber 41 is led into the pressure chamber 19, which is constituted similarly to that of the second embodiment.

Therefore, instead of the connecting passage 15 according to the second embodiment, the two substantially parallel connecting passages 61 and 62 are formed in the small diameter portion 5a of the piston rod 5, similarly to the third embodiment.

According to this embodiment, the pressure of the pressure chamber 18, which acts on the throttle valve 12 upwardly in the figure, is equal to the pressure of the oil chamber 42, and the pressure of the pressure chamber 19, which acts on the throttle valve 14 downwardly in the figure, is equal to the pressure of the oil chamber 41. Therefore, during the expansion side stroke of the piston 1, the resistance pressure that acts to close the throttle valve 12 in the high speed region is smaller than that of the second embodiment, and as a result, the throttle valve 12 can be caused to generate greater damping force under the plate spring 25, which has an identical spring constant.

Further, during the contraction side stroke of the piston 1, the resistance pressure that acts to close the throttle valve 14 in the high speed region is smaller than that of the second embodiment, and as a result, the throttle valve 14 can be caused to generate greater damping force under the plate spring 29, which has an identical spring constant.

Referring to FIGS. 6-12, a fifth embodiment of this invention will be described.

A hydraulic shock absorber according to this embodiment corresponds to the hydraulic shock absorber of the third embodiment, in which rings 38 and 39 are interposed in the respective parts of the throttle valves 12 and 14 that contact the plate springs 25 and 29.

Figure 6:
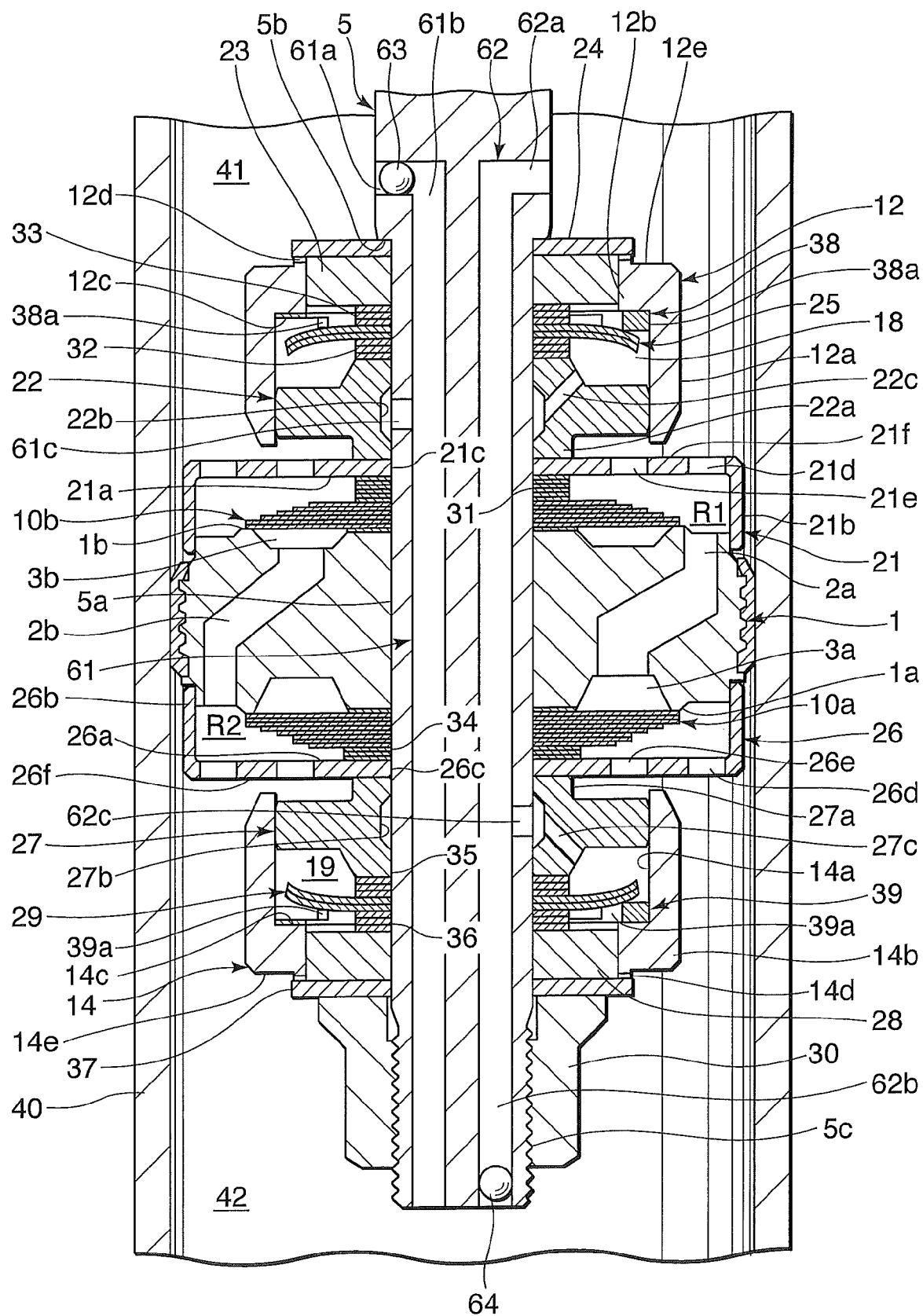
FIG. 6 is a longitudinal sectional view of essential parts of a shock absorber including a damping force generating mechanism according to a fifth embodiment of this invention.

Referring to FIG. 6, in this embodiment, the ring 38 is formed with a plurality of projecting portions 38a and sandwiched between the plate spring 25 and the step 12c of the throttle valve 12. The projecting portions 38a are formed at equal angular intervals in three locations on the outer periphery of the plate spring 25 as strip-form projections that curve around the outer periphery of the ring 38. The outer periphery of the plate spring 25 contacts the projecting portions 38a while applying an initial load thereto in advance.

The ring 39 is constituted identically to the ring 38, and is sandwiched between the plate spring 29 and the step portion 14c of the throttle valve 14.

All other constitutions of the hydraulic shock absorber are identical to their counterparts in the third embodiment.

Next, effects brought about by the rings 38 and 39 will be described.

In the first-fourth embodiments, the plate springs 25 and 29 deform such that the outer periphery thereof is bent back when the throttle valves 12 and 14 displace in the direction of the piston 1 and apply a spring load based on a restoring force from this deformation to the throttle valves 12 and 14. Deformation of the plate springs 25 and 29 in a direction for bending back the outer periphery inevitably exerts a pressure that reduces a diameter of the outer periphery of the plate springs 25 and 29. Therefore, the respective outer peripheries of the plate springs 25 and 29 contact the throttle valves 12 and 14 around their entire circumferences such that circumferential direction deformation of the plate springs 25 and 29 generated by the diameter reducing pressure is restricted. Hence, stress increases rapidly in the plate springs 25 and 29 in relation to displacement of the throttle valves 12 and 14 in the direction of the piston 1, and as a result, a large repulsive force is exerted on the throttle valves 12 and 14.

Figure 7:
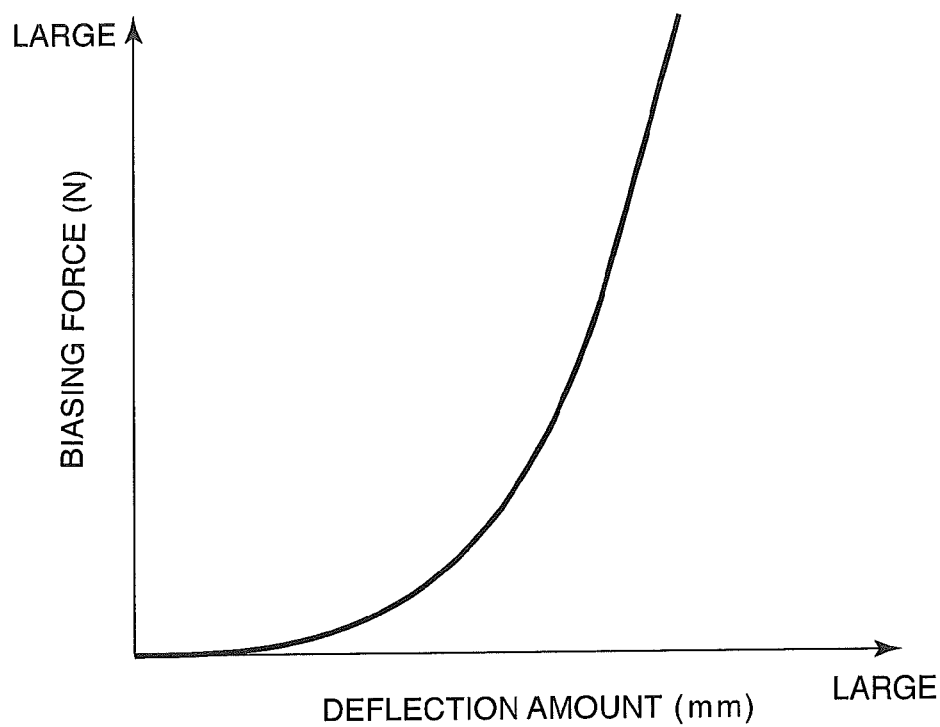
FIG. 7 is a diagram illustrating a typical biasing force characteristic of a plate spring.

Referring to FIG. 7, for the above reason, the plate springs 25 and 29 according to the first-fourth embodiments possess a non-linear characteristic whereby the biasing force thereof increases rapidly in relation to a deflection amount. Further, when the plate springs 25 and 29 are used, a stroke distance of the throttle valves 12 and 14 must be limited to ensure that the rapidly increasing stress generated in the plate springs 25 and 29 in relation to displacement of the throttle valves 12 and 14 does not exceed a permissible stress. However, this characteristic does not always allow the throttle valves 12 and 14 to provide the hydraulic shock absorber with a favorable damping force characteristic. To produce a favorable damping force characteristic in the hydraulic shock absorber, the springs that bias the throttle valves 12 and 14 may require a near-linear biasing force characteristic such as that of a coil spring. Alternatively, it may be necessary to increase the stroke distance of the throttle valves 12 and 14.

Figure 8:
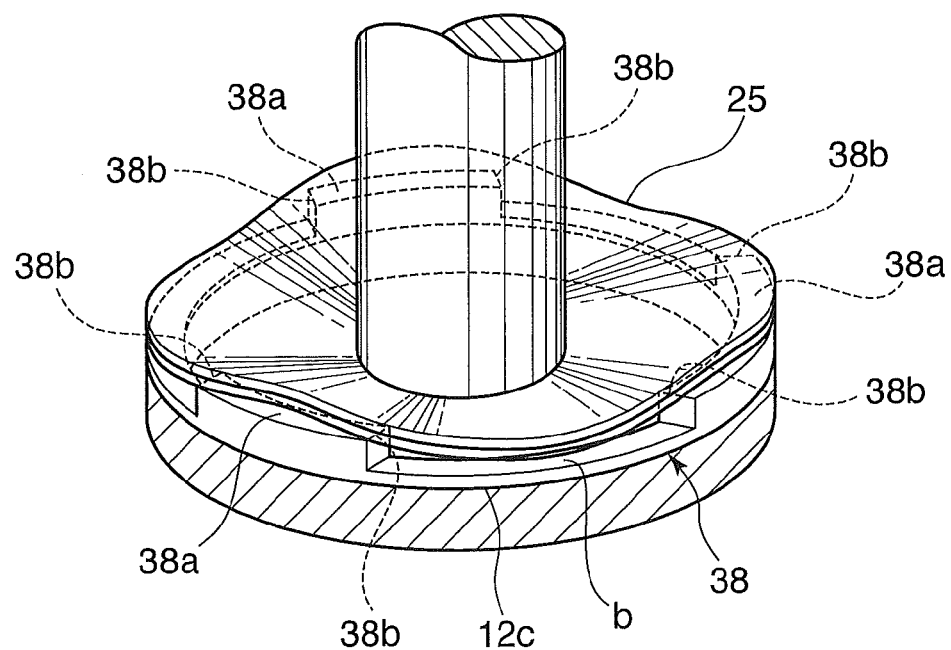
FIG. 8 is a perspective view of the plate spring, illustrating a plate spring deformation condition produced by a ring according to the fifth embodiment of this invention.

The present inventors arrived at the conclusion that in order to obtain a near-linear biasing force characteristic in the plate springs 25 and 29 while keeping the plate springs 25 and 29 compact and to obtain a sufficient stroke distance in the throttle valves 12 and 14, a structure must be provided to allow circumferential direction wave-form deformation in the plate springs 25 and 29. As a result of further research, the inventors arrived at the conclusion that the ring 38(39) having the shape shown in FIG. 8 is preferably employed as this structure for allowing circumferential direction wave-form deformation in the plate springs 25 and 29.

By allowing circumferential direction wave-form deformation in the plate springs 25 and 29 when the plate springs 25 and 29 bend back in accordance with displacement of the throttle valves 12 and 14 in the direction of the piston 1, the diameter reducing pressure acting on the outer periphery of the plate springs 25 and 29 as the plate springs 25 and 29 bend back is absorbed by the wave-form deformation of the plate springs 25 and 29, and as a result, an increase in the internal stress of the plate springs 25 and 29 can be suppressed. In the ring 38(39), which contacts the plate spring 25(29) via the projecting portions 38a(39a), spaces b into which a wave-form deformation portion of the plate spring 25(29) escapes are provided between the projecting portions 38a(39a), and therefore the plate spring 25(29) is encouraged to deform in wave form by an axial direction force exerted on the plate spring 25(29) by the throttle valve 12(14). It should be noted that FIG. 8 shows a state in which wave-form deformation is underway in the plate spring 25(29) due to displacement of the throttle valves 12 and 14 in the direction of the piston 1. In a non-load condition, the plate springs 25 and 29 are constituted by flat annular plate-shaped laminated bodies that do not deform in wave form.

In this embodiment, two end portions 38b(39b) of the projecting portion 38a(39a) are set to be parallel to each other. The end portions 38b(39b) may be set on a straight line oriented toward the center of the ring 38(39).

When the throttle valve 12(14) displaces in the direction of the piston 1, the projecting portions 38a(39a) provided on the outer periphery of the ring 38(39) press the plate spring 25(29). As a result, the outer peripheral portion of the plate spring 25(29) bends back in the direction of the piston 1 such that stress is generated in a diameter reducing direction in the outer peripheral portion of the plate spring 25(29). This stress generates circumferential direction wave-form deformation in the plate spring 25(29). At this time, the spaces b between the projecting portions 38a receive the wave-form deformation of the plate spring 25(29), and therefore an increase in the internal stress of the plate spring 25(29) is suppressed.

By suppressing an increase in the internal stress of the plate spring 25(29) due to the diameter reducing pressure, a biasing force generated by the outer peripheral deflection of the plate spring 25(29) becomes the dominant part of the biasing force of the plate spring 25(29) exerted on the throttle valve 12(14). As a result, the biasing force of the plate spring 25(29) exhibits a characteristic that is substantially commensurate with the deflection amount of the outer periphery, as shown by a solid line in FIG. 9. When a relationship between the deflection amount and the biasing force is linear, biasing force variation among the individual plate spring 25(39) can be prevented. Moreover, the spaces provided between the projecting portions 38a allow large wave-form deformation in the plate springs 25(29), and therefore the throttle valve 14(12) can be provided with a sufficient stroke distance.

Hence, by employing the ring 38(39) formed with the projecting portions 38a(39a), the damping force characteristic of the hydraulic shock absorber can be improved further.

In this embodiment, the parts of the projecting portions 38a(39a) that contact the plate spring 25(29) are set on an identical circumference. This is preferable in order to make a pressing force exerted on the ring 38(39) by the plate spring 25(29) uniform. However, the formation positions of the projecting portions 38a(39a) may be varied such that each projecting portion 38a(39a) contacts the plate spring 25(29) on a different circumference.

Next, the results of analysis performed by the inventors with regard to a preferable circumferential direction length of the projecting portions 38a(39a) formed on the ring 38(39) will be described. Here, the circumferential direction length of the projecting portions 38a(39a) indicates the length of an arc of the inner periphery of the projecting portion 38a(39a).

Figure 9:
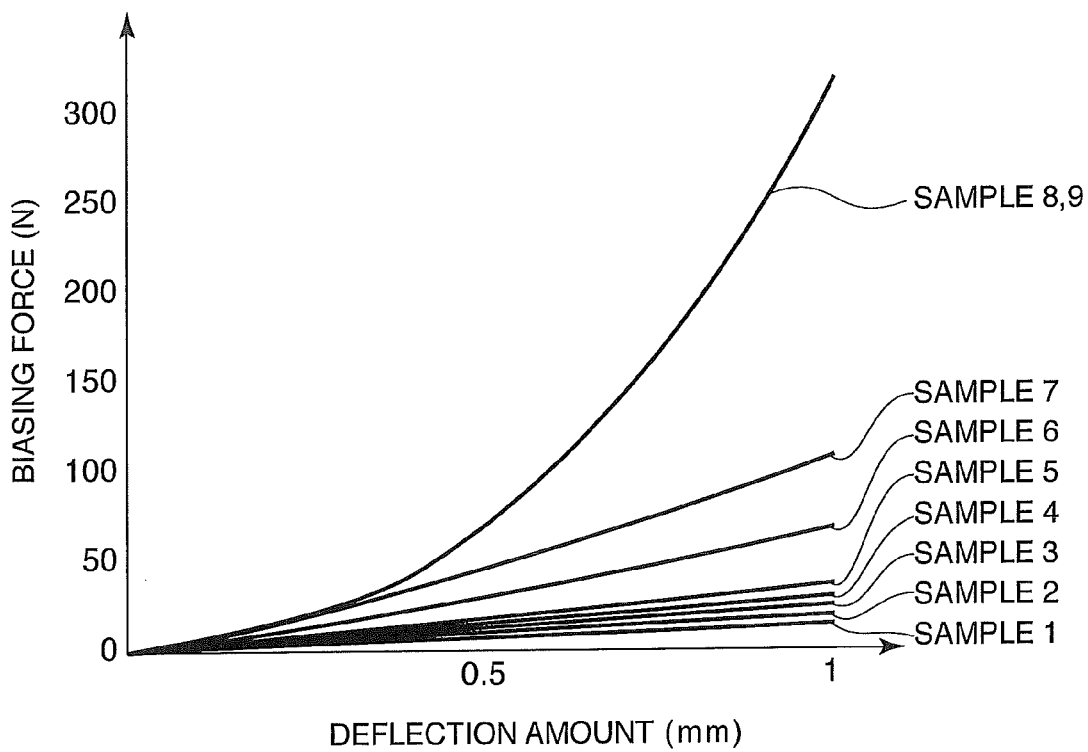
FIG. 9 is a diagram illustrating a biasing force characteristic of the plate spring corresponding to dimensions of a projecting portion, according to the fifth embodiment of this invention.

FIG. 9 shows a relationship between the deflection amount and the biasing force of the plate spring 25(29) when the ring 38(39), which includes projecting portions 38a(39a) of various circumferential direction lengths, is biased by the plate spring 25(29). An inner diameter, an outer diameter, and a thickness of the plate spring 25(29) are set at 12.5 mm, 25 mm, and 0.114 mm, respectively. The projecting portions 38a(39a) are disposed in three locations of the ring 38(39) at equal angular intervals in the circumferential direction. The inner periphery of the projecting portions 38a(39a) is positioned on a circumference having a diameter of 24 mm. Assuming that the three projecting portions 38a(39a) press the plate spring 25(29) concentrically, analysis results relating to the deflection amount and the biasing force of the platespring 25(29) in samples 1 to 9 obtained by varying the circumferential direction length of the projecting portion 38a(39a) are shown by curved lines in the figure.

Figure 10:
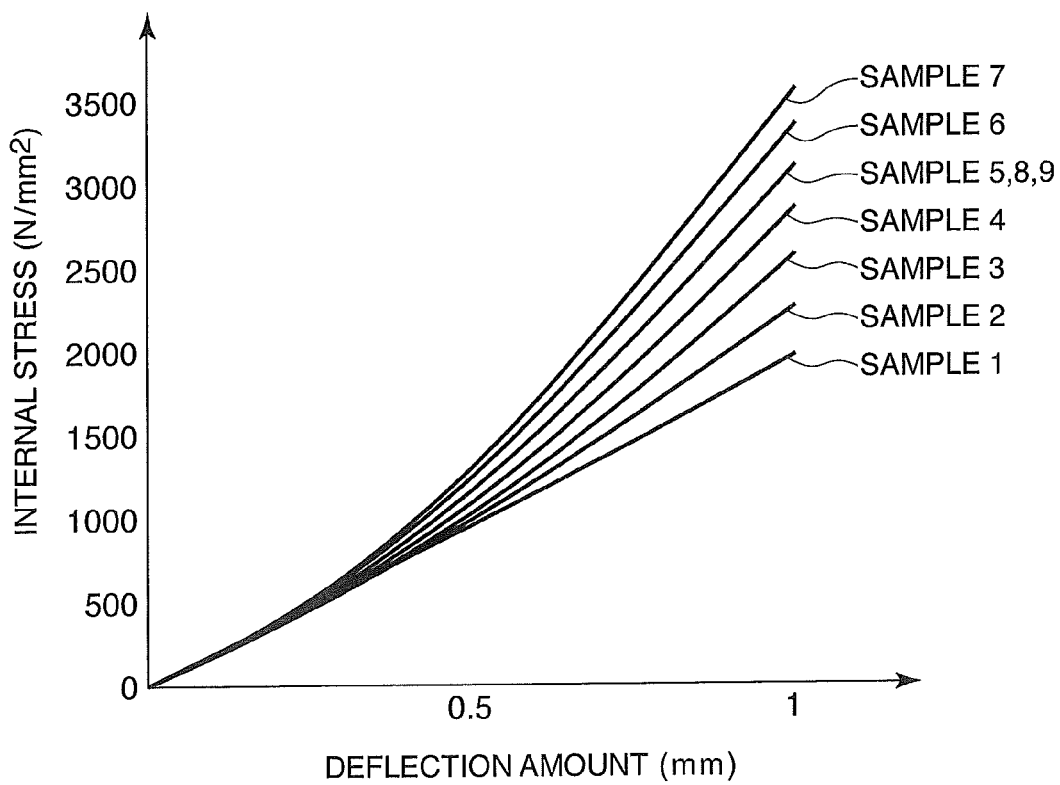
FIG. 10 is a diagram illustrating an internal stress characteristic of the plate spring corresponding to a circumferential direction length of the projecting portion, according to the fifth embodiment of this invention.

FIG. 10 shows a maximum value of the internal stress generated in the plate spring 25(29) under identical analysis conditions to FIG. 9.

The circumferential direction length of the projecting portions 38a(39a) and the circumferential direction length of the spaces b provided between the projecting portions 38a(39a) in samples 1-8 are as follows. It should be noted that sample 9 corresponds to a case in which the spaces b do not exist such that the entire circumference of the plate spring 25(29) contacts the ring 38(39).

|          | CIRCUMFERENTIAL DIRECTION LENGTH OF PROJECTING PORTION 38a(39a) (mm) | CIRCUMFERENTIAL DIRECTION LENGTH OF SPACE b (mm) |
|----------|----------|----------|
| SAMPLE 1 | 4.02  | 21.11 |
| SAMPLE 2 | 6.06  | 19.07 |
| SAMPLE 3 | 8.16  | 16.98 |
| SAMPLE 4 | 10.31 | 14.82 |
| SAMPLE 5 | 13.22 | 11.91 |
| SAMPLE 6 | 17.51 | 7.62  |
| SAMPLE 7 | 20.35 | 4.78  |
| SAMPLE 8 | 23.64 | 1.49  |

Referring to FIG. 9, from sample 1 to sample 7, in which the circumferential direction length of the projecting portion 38a(39a) is 20.35 mm and the circumferential direction length of the space b is 4.78 mm, a line representing the relationship between the deflection amount and the biasing force of the plate spring 25(29) is closer to being linear than that of sample 9, in which the space b is not provided. Further, the biasing force of the plate spring 25(29) decreases relative to the deflection amount as the circumferential direction length of the projecting portion 38a(39a) decreases, or in other words as the circumferential direction length of the space b increases.

Referring to FIG. 10, from sample 1 to sample 4, in which the circumferential direction length of the projecting portion 38a(39a) is 10.31 mm and the circumferential direction length of the space b is 4.82 mm, an incline of the internal stress relative to the deflection amount is smaller than that of sample 9, in which the entire circumference of the plate spring 25(29) contacts the ring 38(39). Further, it can be seen that in this range, the maximum value of the internal stress decreases relative to the deflection amount as the circumferential direction length of the projecting portion 38a(39a) decreases.

It can be seen from the results of the analysis conducted by the inventors and described above that the circumferential direction length of the projecting portions 38a(39a) formed on the ring 38(39) should be set such that the spaces b formed between the projecting portions 38a(39a) have a sufficient capacity for receiving the wave-form deformation of the plate spring 25(29). To cause the relationship between the deflection amount and the biasing force of the plate spring 25(29) to approximate a proportional relationship, a total extension of the circumferential direction length of all of the projecting portions 38a(39a) should basically be set at or below approximately 81% of a circumferential length of a circle that passes through the inner periphery of the projecting portions 38a. To reduce internal stress relative to the deflection amount of the plate spring 25(29), the total extension of the circumferential direction length of all of the projecting portions 38a(39a) should basically be set at or below approximately 41% of the circumferential length of the circle that passes through the inner periphery of the projecting portions 38a(39a).

In this embodiment, the number of projecting portions 38a(39a) is set at three, but according to the research performed by the inventors, as long as two or more projecting portions 38a(39a) are provided, the space b for receiving the wave-form deformation of the plate spring 25(29) can be provided between the projecting portions 38a(39a), and therefore the effects of making the biasing force linear and reducing the internal stress can be obtained.

Next, the height of the projecting portions 38a(39a) will be described. In the following description, a surface of the ring 38(39) that faces the plate spring 25(29) other than the projecting portions 38a(39a) is referred to as a reference surface. As noted above, when the outer periphery of the plate spring 25(29) bends back in the piston 1 direction, a circumferential direction contracting force acts on the outer periphery of the plate spring 25(29), leading to circumferential direction wave-form deformation in the plate spring 25(29). A height of the wave increases as a deformation amount of the plate spring 25(29) increases.

When the height of the wave increases beyond the height of the projecting portions 38a(39a) such that the wave contacts the reference surface of the ring 38(39), which constitutes a bottom surface of the space b, further wave-form deformation of the plate spring 25(29) is restricted by the ring 38(39).

Figure 11:
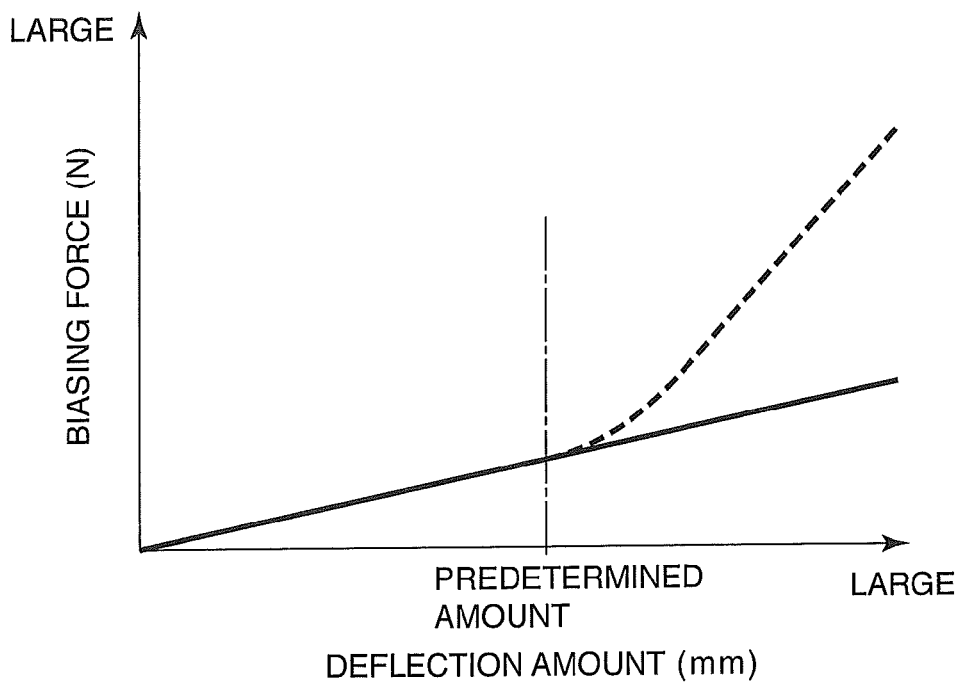
FIG. 11 is a diagram illustrating an effect of a height of the projecting portion on the biasing force of the plate spring, according to the fifth embodiment of this invention.

Referring to FIG. 11, after the plate spring 25(29) contacts the reference surface, the biasing force of the plate spring 25(29) increases rapidly relative to an increase in the deflection amount of the plate spring 25(29), as shown by a broken line in the figure. A solid line in the figure indicates the biasing force when the reference surface exists in a position not contacted by the plate spring 25(29) during the wave-form deformation.

In other words, by setting the height of the projecting portions 38a(39a) such that the plate spring 25(29) does not contact the reference surface of the ring 38(39) forming the bottom surface of the space b even when the throttle valve 12(14) strokes until it is seated on the annular seat portion 21f(26f), the biasing force of the plate spring 25(29) exhibits a near-linear characteristic, as shown by the solid line in FIG. 11. Conversely, when the height of the projecting portions 38a(39a) is set such that the plate spring 25(29) contacts the reference surface of the ring 38(39) before the throttle valve 12(14) is seated on the annular seat portion 21f(26f), the biasing force characteristic of the plate spring 25(29) can be varied during the stroke of the throttle valve 12(14), as shown by the broken line in FIG. 11. Hence, by setting the height of the projecting portions 38a(39a), the biasing force characteristic of the plate spring 25(29) can be varied.

The spaces b formed in the ring 38(39) also function to ensure that the space defined by the plate spring 25(29), the throttle valve 12(14), and the first holder 23(28) communicates with the pressure chamber 18(19) at all times. Therefore, in this embodiment, the cutouts 25a(29a) formed in the plate spring 25(29) in the third embodiment are not required.

Figure 12:
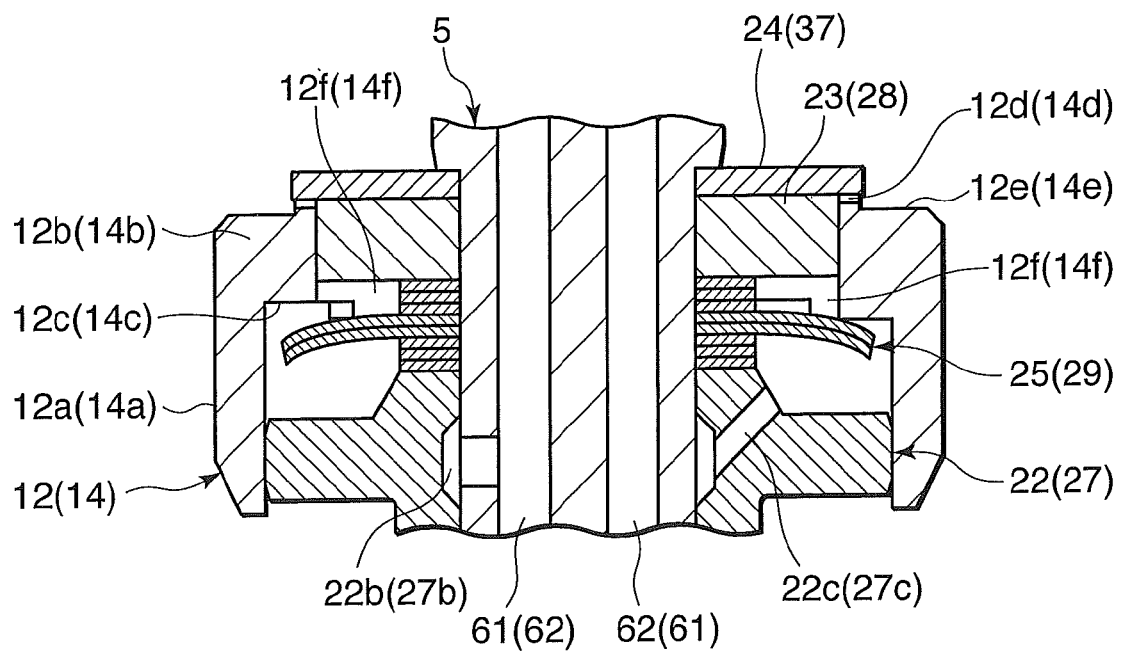
FIG. 12 is a longitudinal sectional view of essential parts of a damping force generating mechanism according to a sixth embodiment of this invention.

Referring to FIG. 12, a sixth embodiment of this invention will be described.

In this embodiment, similar projecting portions 12f(14f) to the projecting portions 38a(39a) are formed in advance on the step 12c(14c) in place of the ring 38(39) sandwiched between the step 12c(14c) and the plate spring 25(29) in the fifth embodiment. In this embodiment, similar favorable effects to those of the fifth embodiment are obtained in relation to the biasing force characteristic of the plate spring 25(29).

Figure 13:
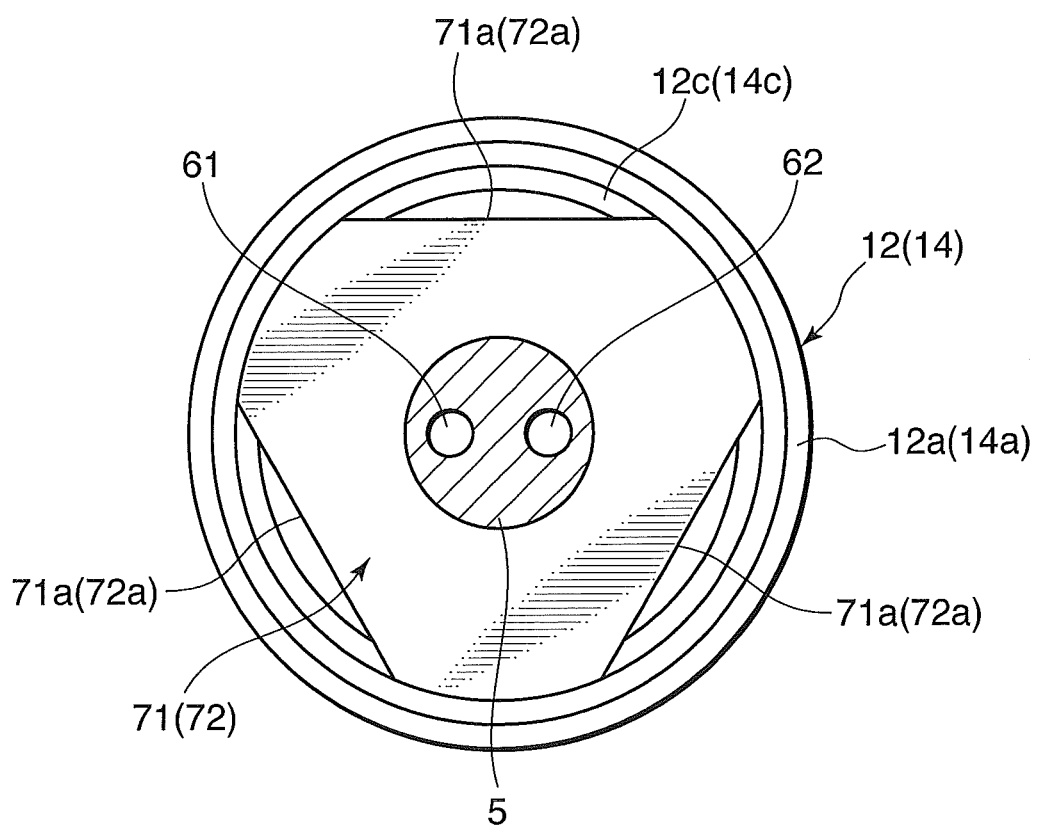
FIG. 13 is a cross-sectional view of a throttle valve including a plate spring according to a seventh embodiment of this invention.

Referring to FIG. 13, a seventh embodiment of this invention will be described.

This embodiment employs a plate spring 71(72) instead of the combination of the plate spring 25(29) formed by laminated annular plates and the ring 38(39) of the fifth embodiment.

The plate spring 71(72) includes cutouts 71a(72a) formed at equal angular intervals in three locations of an outer peripheral portion. The plate spring 71(72) having this shape contacts the step 12c(14c) of the throttle valve 12(14) directly. The plate spring 71(72) contacts the step 12c(14c) in sites thereof that are not formed with the cutouts 71a(72a). Therefore, when the throttle valve 12(14) displaces in the piston 1 direction, an axial direction load acts on the parts of the plate spring 71(72) that contact the step 12c(14c), whereby only sites of the plate spring 71(72) centering on the outer peripheral contact portion are bent back in the piston 1 direction and the cutout 71a(72a) parts undergo substantially no displacement. Hence, a diameter reducing pressure such as that generated when the outer periphery of the circular plate spring 25(29) is pressed uniformly does not act on the plate spring 71(72), and as a result, a rapid increase in the biasing force due to the diameter reducing pressure does not occur. Accordingly, a similar near-linear biasing force characteristic to that of the plate spring 25(29) according to the fifth embodiment can be obtained by the plate spring 71(72) according to this embodiment.

Figure 14:
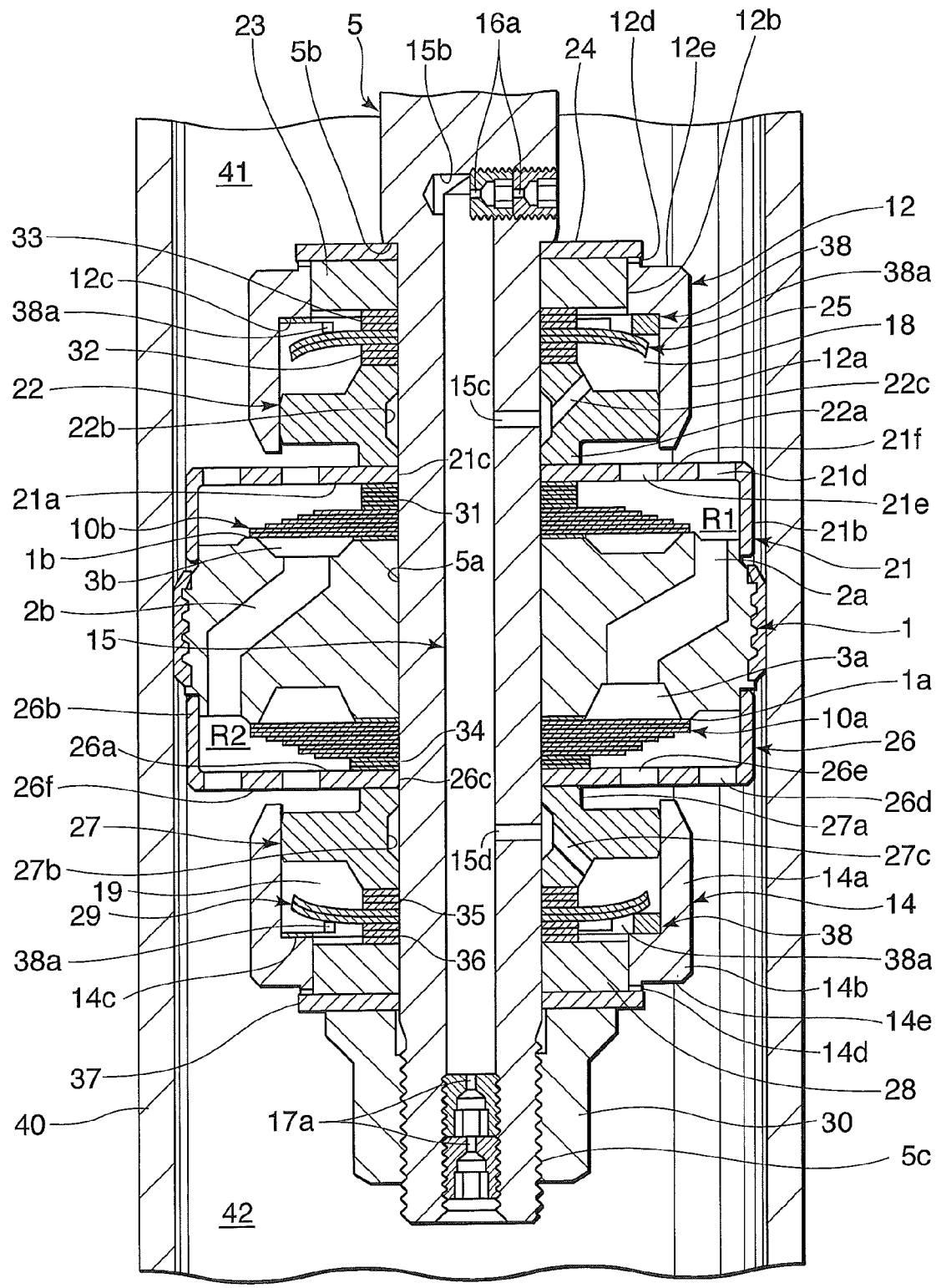
FIG. 14 is a longitudinal sectional view of essential parts of a shock absorber including a damping force generating mechanism according to an eighth embodiment of this invention.

Referring to FIG. 14, an eighth embodiment of this invention will be described.

In this embodiment, the ring 38(39) including the projecting portions 38a(39a) according to the fifth embodiment is sandwiched between the plate spring 25(29) and the step 12c(14c) of the throttle valve 12(14) according to the first embodiment. Hence, a similar biasing force characteristic to that of the fifth embodiment can be obtained by this embodiment.

Figure 15:
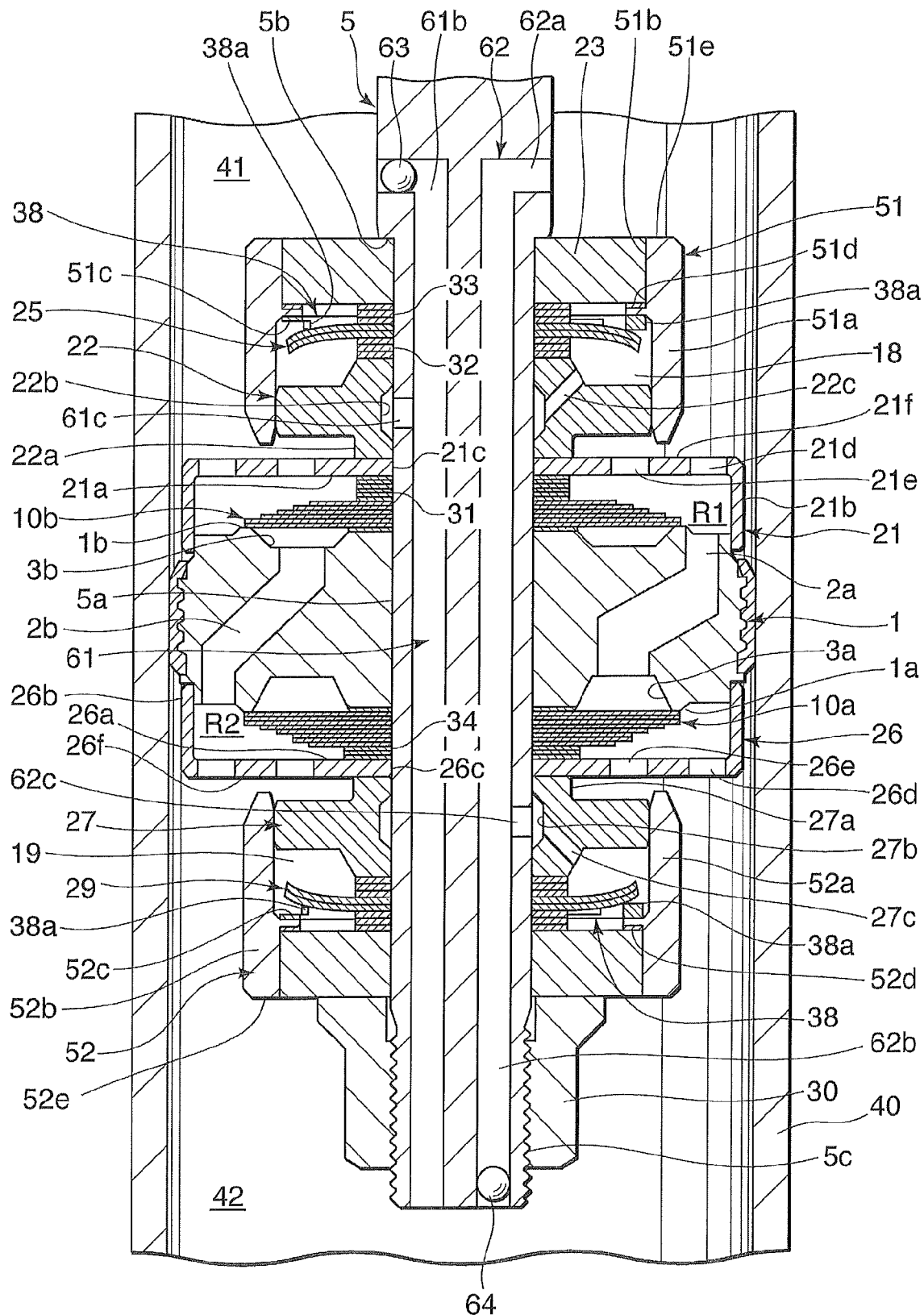
FIG. 15 is a longitudinal sectional view of essential parts of a shock absorber including a damping force generating mechanism according to a ninth embodiment of this invention.
Figure 16:
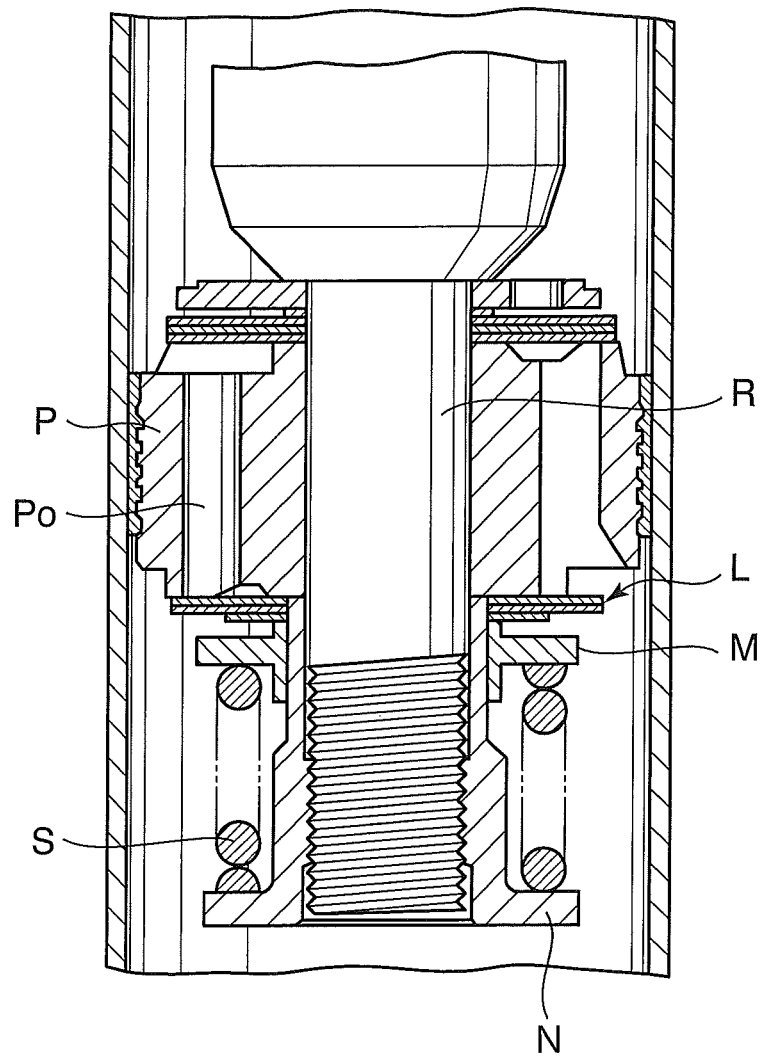
FIG. 16 is a longitudinal sectional view of essential parts of a hydraulic shock absorber, showing a damping force generating mechanism according to a prior art.
Figure 17:
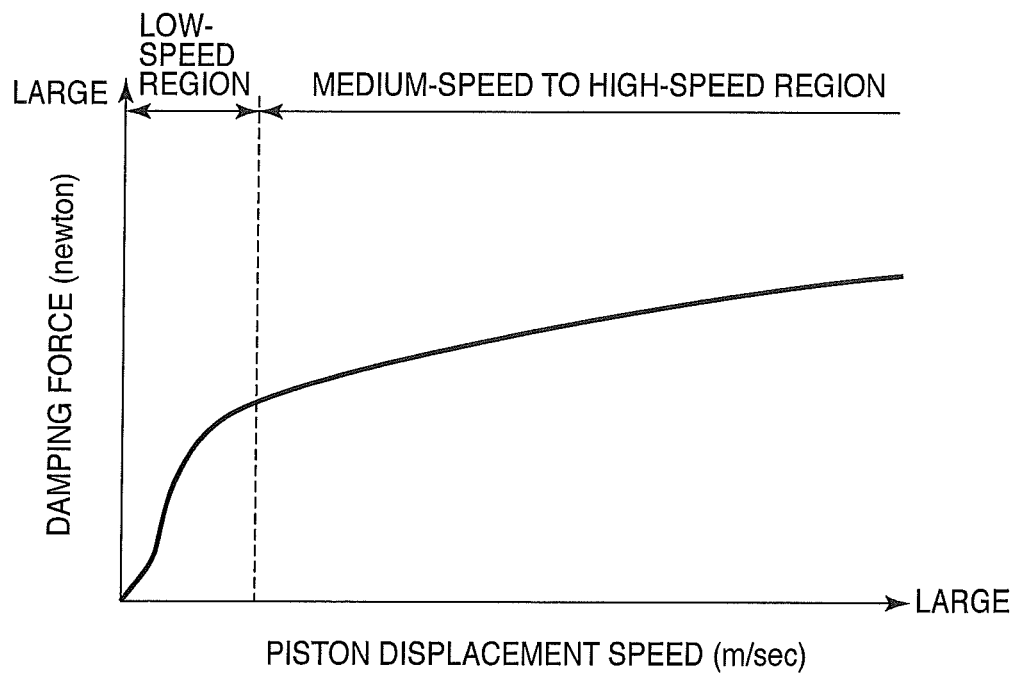
FIG. 17 is a diagram showing a damping force characteristic of the damping force generating mechanism according to the prior art.

Referring to FIG. 15, a ninth embodiment of this invention will be described.

In this embodiment, similar projecting portions 38a(39a) to those of the fifth embodiment are formed on the spring support portion 51c(52c) of the throttle valve 51(52) according to the second embodiment. Hence, a similar biasing force characteristic to that of the fifth embodiment can be obtained by this embodiment.

With respect to the above description, the content of Tokugan 2008-31452 with a filing date of Feb. 13, 2008 in Japan, Tokugan 2008-69784 with a filing date of Mar. 18, 2008 in Japan, and Tokugan 2008-320857 with a filing date of Dec. 17, 2008 in Japan are incorporated herein by reference.

Several specific embodiments of this invention were described above, but this invention is not limited to the above embodiments, and various amendments and modifications may be added to these embodiments by a person skilled in the art within the technical scope of the claims.

INDUSTRIAL APPLICABILITY

As described above, a damping force generating mechanism for a shock absorber according to this invention is capable of generating different damping force characteristics when the shock absorber operates in a medium speed region and when the shock absorber operates in a high speed region. Therefore, a favorable effect is obtained in terms of improving the passenger comfort of a vehicle when the shock absorber according to this invention is interposed between a vehicle body and a vehicle axle of the vehicle.

Exclusive properties and features encompassed by the embodiments of this invention are as claimed below.

The invention claimed is:

1. A damping force generating mechanism for a hydraulic shock absorber in which the shock absorber includes a cylinder, a piston that slides within the cylinder and defines a first fluid chamber and a second fluid chamber in the cylinder, and a piston rod that is joined to the piston so as to project from the cylinder in an axial direction, the damping force generating mechanism comprising:
   a port formed in the piston to cause a fluid to flow from the first fluid chamber to the second fluid chamber;
   a damping valve that closes the port on the second fluid chamber side;
   a passage that connects the first fluid chamber to the port;
   a throttle valve that reduces a flow sectional area of the passage based on a pressure of the first fluid chamber;
   a pressure chamber that exerts an oppositely oriented pressure to the pressure of the first fluid chamber on the throttle valve;
   a plate spring that biases the throttle valve in an opposite direction to the pressure of the first fluid chamber; and
   a connecting passage that is formed in the piston rod and connects the pressure chamber to the second fluid chamber without passing through the damping valve;
   wherein the throttle valve includes a first pressure-receiving surface that receives a pressure of the first fluid chamber and a second pressure-receiving surface that receives a pressure of the pressure chamber in an opposite direction to the first pressure-receiving surface;
   wherein the pressure chamber is formed in the first fluid chamber in a state isolated permanently therefrom, irrespective of a stroke speed of the piston; and
   wherein the throttle valve is configured to reduce a flow cross-sectional area when a differential pressure between the first fluid chamber and the pressure chamber exceeds a biasing force of the plate spring.

2. The damping force generating mechanism as defined in claim 1, wherein the throttle valve is formed in a tubular shape and the plate spring is accommodated inside the throttle valve.

3. The damping force generating mechanism as defined in claim 2, wherein the plate spring includes a laminated body of annular plates.

4. The damping force generating mechanism as defined in claim 3, wherein:
   the throttle valve is fitted respectively to an outer periphery of a disk-shaped first holder fixed to the piston rod and an outer periphery of a disk-shaped second holder fixed to the piston rod; and
   the pressure chamber is surrounded by the first holder, the second holder, and the throttle valve.

5. The damping force generating mechanism as defined in claim 4, wherein the passage includes a first passage that can be closed by the throttle valve, and a second passage that connects the first fluid chamber to the port at all times, regardless of an operation of the throttle valve.

6. The damping force generating mechanism as defined in claim 5, further comprising a partitioning member that is fixed to the piston rod and includes an annular seat portion on which the throttle valve is seated,
   wherein the first passage includes a plurality of through holes that penetrate the partitioning member on an inner side of the annular seat portion, and the second passage includes a plurality of second through holes that penetrate the partitioning member on an outer side of the annular seat portion.

7. The damping force generating mechanism as defined in claim 6, further comprising a step provided on an inner periphery of the throttle valve corresponding to a difference in diameter between the first holder and the second holder,
   wherein the plate spring is formed such that an inner periphery thereof is supported by the piston rod and an outer periphery thereof contacts the step.

8. The damping force generating mechanism as defined in claim 7, further comprising a stopper that restricts displacement of the throttle valve in a separating direction from the annular seat portion to or below a fixed value.

9. The damping force generating mechanism as defined in claim 7, wherein the plate spring includes a cutout provided in a contact portion thereof with the step to connect respective sides of the contact portion.

10. The damping force generating mechanism as defined in claim 6, further comprising an annular spring support portion provided on an inner periphery of the throttle valve to overlap the first holder in the axial direction,
   wherein the plate spring is formed such that an inner periphery thereof is supported by the piston rod and an outer periphery thereof contacts the spring support portion, and
   by causing the spring support portion to contact the first holder, displacement of the throttle valve in a separating direction from the annular seat portion is restricted to or below a fixed value.

11. The damping force generating mechanism as defined in claim 10, wherein the plate spring includes a cutout provided in a contact portion thereof with the spring support portion to connect respective sides of the contact portion.

12. The damping force generating mechanism as defined in claim 4, wherein the plate spring contacts the throttle valve in a plurality of locations on an outer peripheral portion thereof separated by intervals in a circumferential direction.

13. The damping force generating mechanism as defined in claim 12, wherein the outer periphery of the plate spring contacts the throttle valve via a plurality of projecting portions disposed at equal intervals in the circumferential direction, wherein a space that allows wave-form deformation of the plate spring is formed between the projecting portions.

14. The damping force generating mechanism as defined in claim 13, wherein the plurality of projecting portions are formed on a ring sandwiched between the outer periphery of the plate spring and the throttle valve.

15. The damping force generating mechanism as defined in claim 13, wherein in the damping force generating mechanism, the plurality of projecting portions are formed integrally with the throttle valve on an inner side of the throttle valve.

16. The damping force generating mechanism as defined in claim 12, wherein the plate spring has cutouts formed at equal angular intervals in the outer peripheral portion thereof, and a site of the outer peripheral portion in which the cutouts are not formed contacts the throttle valve.

17. A damping force generating mechanism for a hydraulic shock absorber in which the shock absorber includes a cylinder, a piston that slides within the cylinder and defines a first fluid chamber and a second fluid chamber in the cylinder, and a piston rod that is joined to the piston so as to project from the cylinder in an axial direction, the damping force generating mechanism comprising:
- a port formed in the piston to cause a fluid to flow from the first fluid chamber to the second fluid chamber;
- a damping valve that closes the port on the second fluid chamber side;
- a passage that connects the first fluid chamber to the port;
- a throttle valve that reduces a flow sectional area of the passage based on a pressure of the first fluid chamber;
- a pressure chamber that exerts an oppositely oriented pressure to the pressure of the first fluid chamber on the throttle valve;
- a plate spring that biases the throttle valve in an opposite direction to the pressure of the first fluid chamber; and
- a connecting passage that is formed in the piston rod and that connects the pressure chamber to the second fluid chamber without passing through the damping valve;
- wherein the throttle valve includes a first pressure-receiving surface that receives a pressure of the first fluid chamber and a second pressure-receiving surface that receives a pressure of the pressure chamber in an opposite direction to the first pressure-receiving surface;
- wherein the pressure chamber is formed in the first fluid chamber in a state isolated permanently therefrom irrespective of a stroke speed of the piston;
- wherein the throttle valve is configured to reduce a flow cross-sectional area when a differential pressure between the first fluid chamber and the pressure chamber exceeds a biasing force of the plate spring;
- wherein the throttle valve is formed in a tubular shape and the plate spring is accommodated inside the throttle valve; and
- wherein the throttle valve is fitted respectively to an outer periphery of a disk-shaped first holder fixed to the piston rod and an outer periphery of a disk-shaped second holder fixed to the piston rod, and the pressure chamber is surrounded by the first holder, the second holder, and the throttle valve.

* * * * *